(12) United States Patent
Kutz et al.

(10) Patent No.: US 11,290,138 B1
(45) Date of Patent: Mar. 29, 2022

(54) OVER THE AIR DIGITAL PRE-DISTORTION KERNEL FUNCTION SELECTION

(71) Applicant: QUALCOMM Incorporated, San Diego, CA (US)

(72) Inventors: Gideon Kutz, Ramat Hasharon (IL); Amit Bar-Or Tillinger, Tel-Aviv (IL); Ori Ben Shahar, Petach Tikva (IL); Assaf Touboul, Netanya (IL); Ori Barak, Beer Sheva (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/217,447

(22) Filed: Mar. 30, 2021

(51) Int. Cl.
  *H04B 1/04* (2006.01)
  *H04W 8/22* (2009.01)

(52) U.S. Cl.
  CPC ............ *H04B 1/0475* (2013.01); *H04W 8/22* (2013.01)

(58) Field of Classification Search
  CPC .............................. H04B 1/0475; H04W 8/22
  See application file for complete search history.

(56) References Cited

U.S. PATENT DOCUMENTS

| | | | | |
|---|---|---|---|---|
| 5,808,511 A | * | 9/1998 | Kobayashi | H03G 7/08 330/149 |
| 2010/0220810 A1 | * | 9/2010 | Jin | H04L 27/368 375/296 |
| 2021/0273667 A1 | * | 9/2021 | Lv | H04B 1/0475 |

* cited by examiner

*Primary Examiner* — Jaison Joseph
(74) *Attorney, Agent, or Firm* — Patterson + Sheridan, LLP

(57) ABSTRACT

Certain aspects of the present disclosure provide techniques for over-the-air digital pre-distortion (DPD) kernel function selection. A method that may be performed by a user equipment (UE) includes transmitting capability information to a base station (BS), indicating a capability of the UE for performing digital pre-distortion (DPD) training, receiving, based on the capability information, a request from the BS to perform the DPD training, performing, based on the received request, the DPD training, wherein performing the DPD training includes: receiving one or more reference signals (RSs) and selecting, based on the one or more RSs, an ordered set of kernel functions. Additionally, the method may include transmitting feedback information to the BS indicating the ordered set of kernel functions.

56 Claims, 12 Drawing Sheets

OVER THE AIR DIGITAL PRE-DISTORTION KERNEL FUNCTION SELECTION

INTRODUCTION

Aspects of the present disclosure relate to wireless communications, and more particularly, to techniques for over the air (OTA) digital pre-distortion (DPD) kernel function selection.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a user equipment (UE). The method generally includes transmitting capability information to a base station (BS), indicating a capability of the UE for performing digital pre-distortion (DPD) training, receiving, based on the capability information, a request from the BS to perform the DPD training, and performing, based on the received request, the DPD training, wherein performing the DPD training includes: receiving one or more reference signals (RSs) and selecting, based on the one or more RSs, an ordered set of kernel functions. The method also generally includes transmitting feedback information to the BS indicating the ordered set of kernel functions.

Certain aspects can be implemented in a processing system for wireless communication by a user equipment (UE). The processing system generally includes a memory comprising computer-executable instructions and one or more processors configured to execute the computer-executable instructions and cause the processing system to: transmit capability information to a base station (BS), indicate a capability of the UE for performing digital pre-distortion (DPD) training, receive, based on the capability information, a request from the BS to perform the DPD training, and perform, based on the received request, the DPD training, wherein in order to perform the DPD training, the one or more processors are configured to cause the processing system to receive one or more reference signals (RSs) and select, based on the one or more RSs, an ordered set of kernel functions. Additionally, the one or more processors may further be configured to cause the processing system to transmit feedback information to the BS indicating the ordered set of kernel functions.

Certain aspects can be implemented in an apparatus for wireless communication by a user equipment (UE). The apparatus may include means for transmitting capability information to a base station (BS), indicating a capability of the UE for performing digital pre-distortion (DPD) training, means for receiving, based on the capability information, a request from the BS to perform the DPD training, and means for performing, based on the received request, the DPD training, wherein the means for performing the DPD training includes: means for receiving one or more reference signals (RSs) and means for selecting, based on the one or more RSs, an ordered set of kernel functions. The apparatus also generally includes means for transmitting feedback information to the BS indicating the ordered set of kernel functions.

Certain aspects can be implemented in a non-transitory computer-readable medium for wireless communication by a user equipment (UE). The non-transitory computer-readable medium may comprise computer-executable instructions that, when executed by one or more processors of a processing system, cause the processing system to: transmit capability information to a base station (BS), indicate a capability of the UE for performing digital pre-distortion (DPD) training, receive, based on the capability information, a request from the BS to perform the DPD training, and perform, based on the received request, the DPD training, wherein in order to perform the DPD training, the one or more processors are configured to cause the processing system to receive one or more reference signals (RSs) and select, based on the one or more RSs, an ordered set of kernel functions. Additionally, the non-transitory computer-readable medium may comprise computer-executable instructions that, when executed by one or more processors of a processing system, cause the processing system to transmit feedback information to the BS indicating the ordered set of kernel functions.

Certain aspects can be implemented in a computer program product for wireless communication by a user equipment (UE) embodied on a computer-readable storage medium. The computer-readable storage medium may comprise code for transmitting capability information to a base station (BS), indicating a capability of the UE for performing digital pre-distortion (DPD) training, receiving, based on the capability information, a request from the BS to perform the DPD training, and performing, based on the received request, the DPD training, wherein performing the DPD training includes: receiving one or more reference signals (RSs) and selecting, based on the one or more RSs, an ordered set of kernel functions. The computer-readable storage medium may also comprise code for transmitting feedback information to the BS indicating the ordered set of kernel functions.

Certain aspects can be implemented in a method for wireless communication performed by a base station (BS). The method generally includes receiving capability information from a user equipment (UE), indicating a capability of the UE for performing digital pre-distortion (DPD) training, transmitting, based on the capability information, a request to the UE to perform the DPD training, transmitting, based on the request, one or more reference signals to the (RS) for performing the DPD training, receiving, based on the one or more RSs, feedback information from the UE indicating an ordered set of kernel functions, and adjusting one or more kernels associated with a power amplifier of the BS based on the ordered set of kernel functions to reduce the distortion of the signals transmitted by the BS.

Certain aspects can be implemented in a processing system for wireless communication by a base station (BS). The processing system generally includes a memory comprising computer-executable instructions and one or more processors configured to execute the computer-executable instructions and cause the processing system to: receive capability information from a user equipment (UE), indicating a capability of the UE for performing digital pre-distortion (DPD) training, transmit, based on the capability information, a request to the UE to perform the DPD training, transmit, based on the request, one or more reference signals to the (RS) for performing the DPD training, receive, based on the one or more RSs, feedback information from the UE indicating an ordered set of kernel functions, and adjust one or more kernels associated with a power amplifier of the BS based on the ordered set of kernel functions to reduce the distortion of the signals transmitted by the BS.

Certain aspects can be implemented in an apparatus for wireless communication by a base station (BS). The apparatus may include means for receiving capability information from a user equipment (UE), indicating a capability of the UE for performing digital pre-distortion (DPD) training, means for transmitting, based on the capability information, a request to the UE to perform the DPD training, means for transmitting, based on the request, one or more reference signals to the (RS) for performing the DPD training, receiving, based on the one or more RSs, feedback information from the UE indicating an ordered set of kernel functions, and means for adjusting one or more kernels associated with a power amplifier of the BS based on the ordered set of kernel functions to reduce the distortion of the signals transmitted by the BS.

Certain aspects can be implemented in a non-transitory computer-readable medium for wireless communication by a base station (BS). The non-transitory computer-readable medium may comprise computer-executable instructions that, when executed by one or more processors of a processing system, cause the processing system to: receive capability information from a user equipment (UE), indicating a capability of the UE for performing digital pre-distortion (DPD) training, transmit, based on the capability information, a request to the UE to perform the DPD training, transmit, based on the request, one or more reference signals to the (RS) for performing the DPD training, receive, based on the one or more RSs, feedback information from the UE indicating an ordered set of kernel functions, and adjust one or more kernels associated with a power amplifier of the BS based on the ordered set of kernel functions to reduce the distortion of the signals transmitted by the BS.

Certain aspects can be implemented in a computer program product for wireless communication by a base station (BS) embodied on a computer-readable storage medium. The computer-readable storage medium may comprise code for: receiving capability information from a user equipment (UE), indicating a capability of the UE for performing digital pre-distortion (DPD) training, transmitting, based on the capability information, a request to the UE to perform the DPD training, transmitting, based on the request, one or more reference signals to the (RS) for performing the DPD training, receiving, based on the one or more RSs, feedback information from the UE indicating an ordered set of kernel functions, and adjusting one or more kernels associated with a power amplifier of the BS based on the ordered set of kernel functions to reduce the distortion of the signals transmitted by the BS.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for over-the-air (OTA) digital pre-distortion (DPD) kernel selection.

Wireless communication devices, such as a base station (BS) or a user equipment (UE), generally include transmit chains that include non-linear (NL) components such as power amplifiers (PA) that may distort transmitted radio frequency (RF) signals. To avoid such non-linearity and distortions of signals, DPD may be performed by the BS prior to amplification of the signals. One goal of DPD is to determine a set of non-linearity coefficients associated with kernel functions that may be used to pre-distort signals to account for the non-linearity of the PA, and thus create non-distorted output signals.

In some cases, DPD may be performed with the assistance of one or more UEs. For instance, the base station may transmit an indication of one or more of training parameters to the UE along with a reference signal, and the UE may compute or otherwise determine the non-linearity coefficients based on the reference signal and the one or more training parameters. The UE may then transmit an indication of the set of non-linearity coefficients to the base station to be used to modify signals.

In some aspects described herein, DPD functionality uses a linear combination of non-linear functions called kernel functions. Accordingly, the OTA DPD training process may be used to determine the best linear combination of the kernel functions (e.g., coefficients for linearly combining the kernel functions) to compensate for PA non-linearity at a base station. While certain OTA DPD training processes involve the determination of a set of non-linearity coefficients, a complimentary DPD training process may be used select a set of kernel functions for DPD functionality. However, kernel function selection may be expensive in terms of processing and power at the UE. Therefore, aspects of the present disclosure provide techniques for assisting with OTA DPD kernel function selection to help alleviate the processing and power requirements associated therewith. Such techniques may include selection algorithms that may be used to scan sets of kernel functions and evaluation functions that may be used to select particular kernel functions that provide good performance. Thus, aspects described herein improve upon conventional solutions by providing a more time and power efficient manner to perform DPD using various communication system elements, including UEs and base stations. The improved DPD leads to improved signaling quality, which makes the wireless communication more efficient and thereby saves power at the UE and BS (e.g., from avoided retransmissions and reprocessing of signals).

Introduction to Wireless Communication Networks

Figure 1:
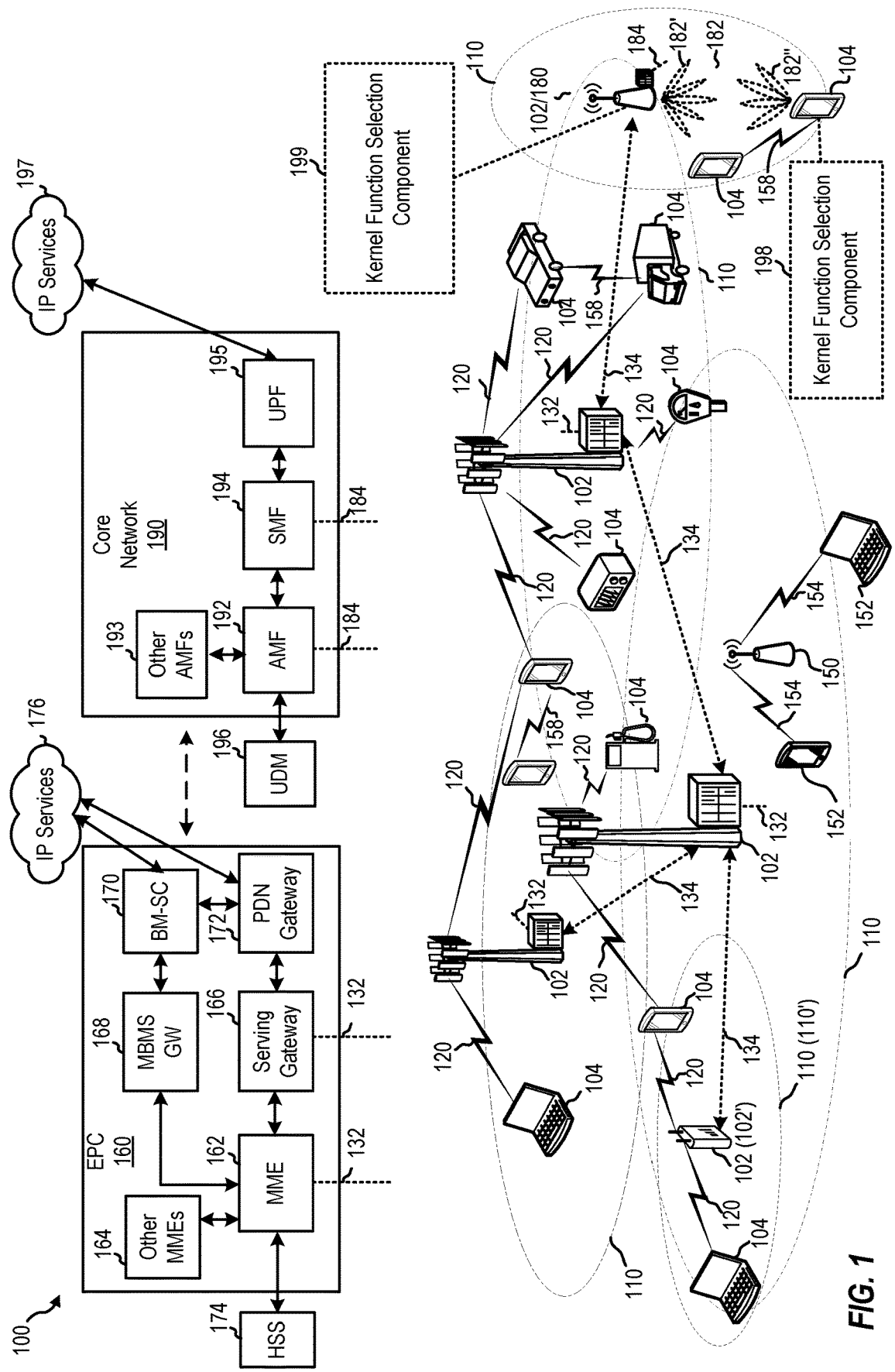
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 6:
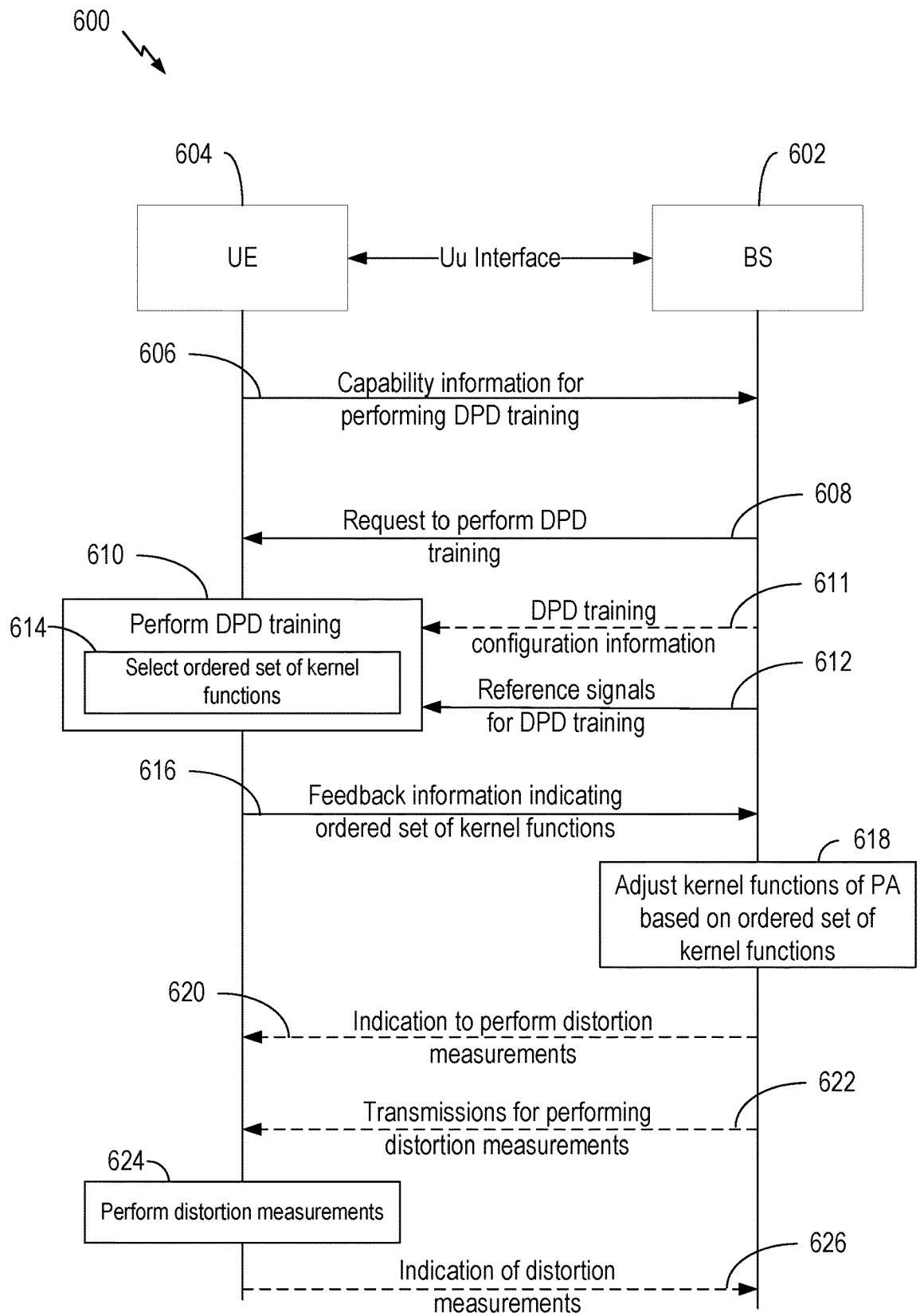
FIG. 6 is a call flow diagram illustrating example operations between a base station and a user equipment for over-the-air digital pre-distortion kernel function selection.
Figure 9:
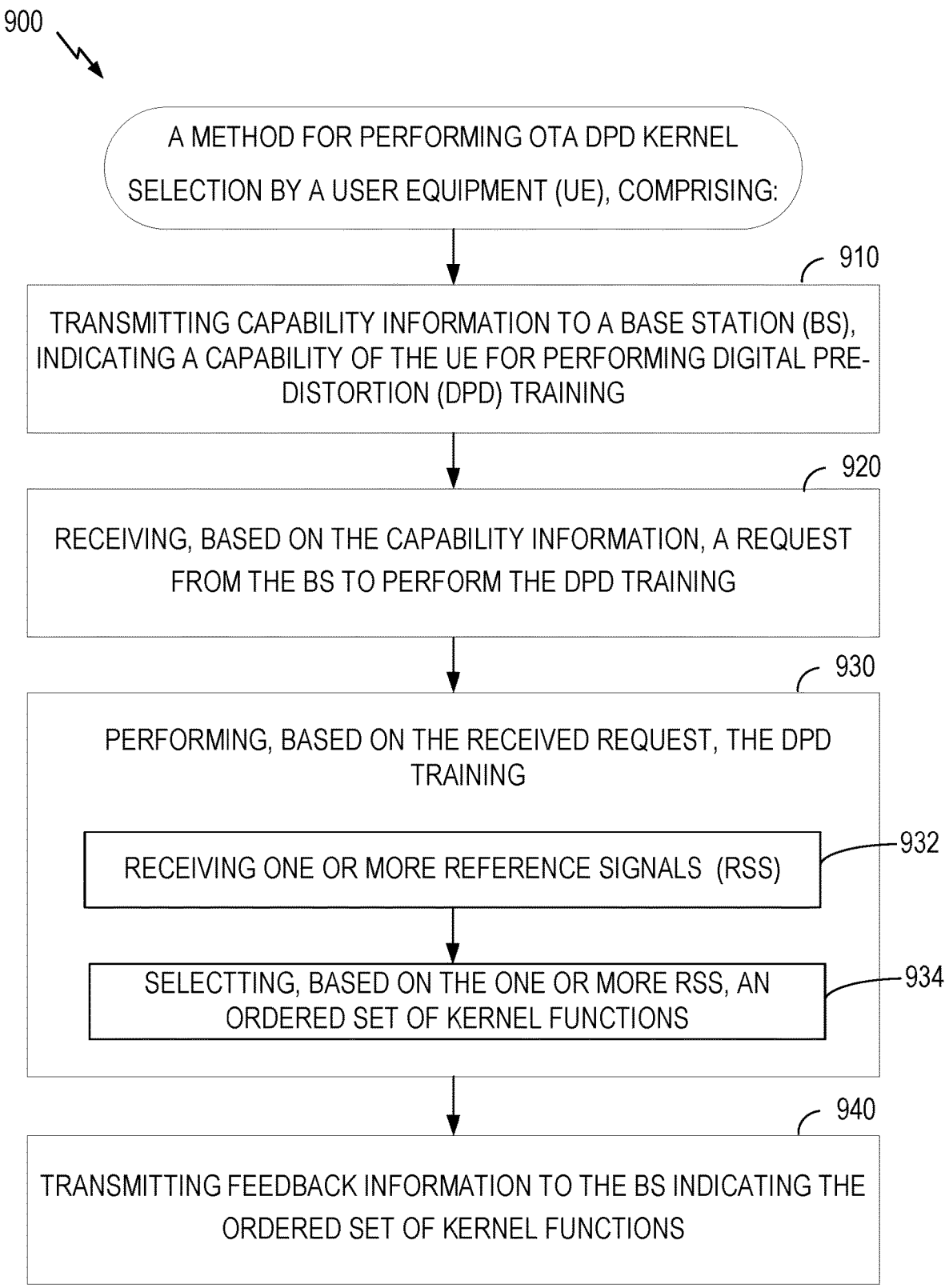
FIG. 9 is a flow diagram illustrating example operations for wireless communication by a user equipment.
Figure 10:
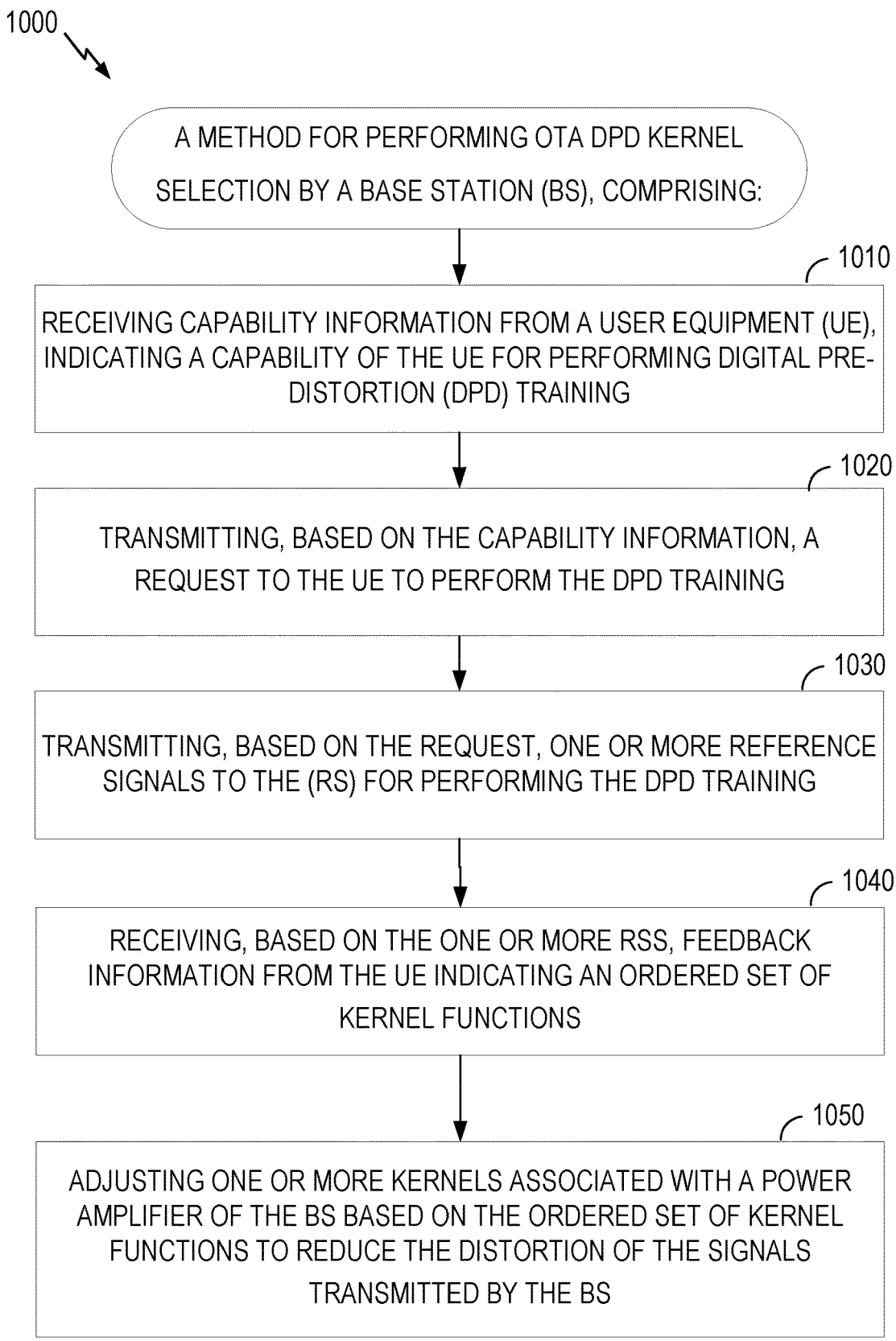
FIG. 10 is a flow diagram illustrating example operations for wireless communication by a base station.

As shown, the BS 102 may include a kernel function selection component 199, which may be configured to perform one or more of the operations illustrated in FIG. 6 or FIG. 10, as well as other operations described herein for over-the-air (OTA) digital pre-distortion (DPD) kernel function selection. Additionally, as shown, the UE 104 may include kernel selection component 198, which may be used configured to perform one or more of the operations illustrated in FIG. 6 or FIG. 9, as well as other operations described herein for OTA DPD kernel function selection.

Figure 2:
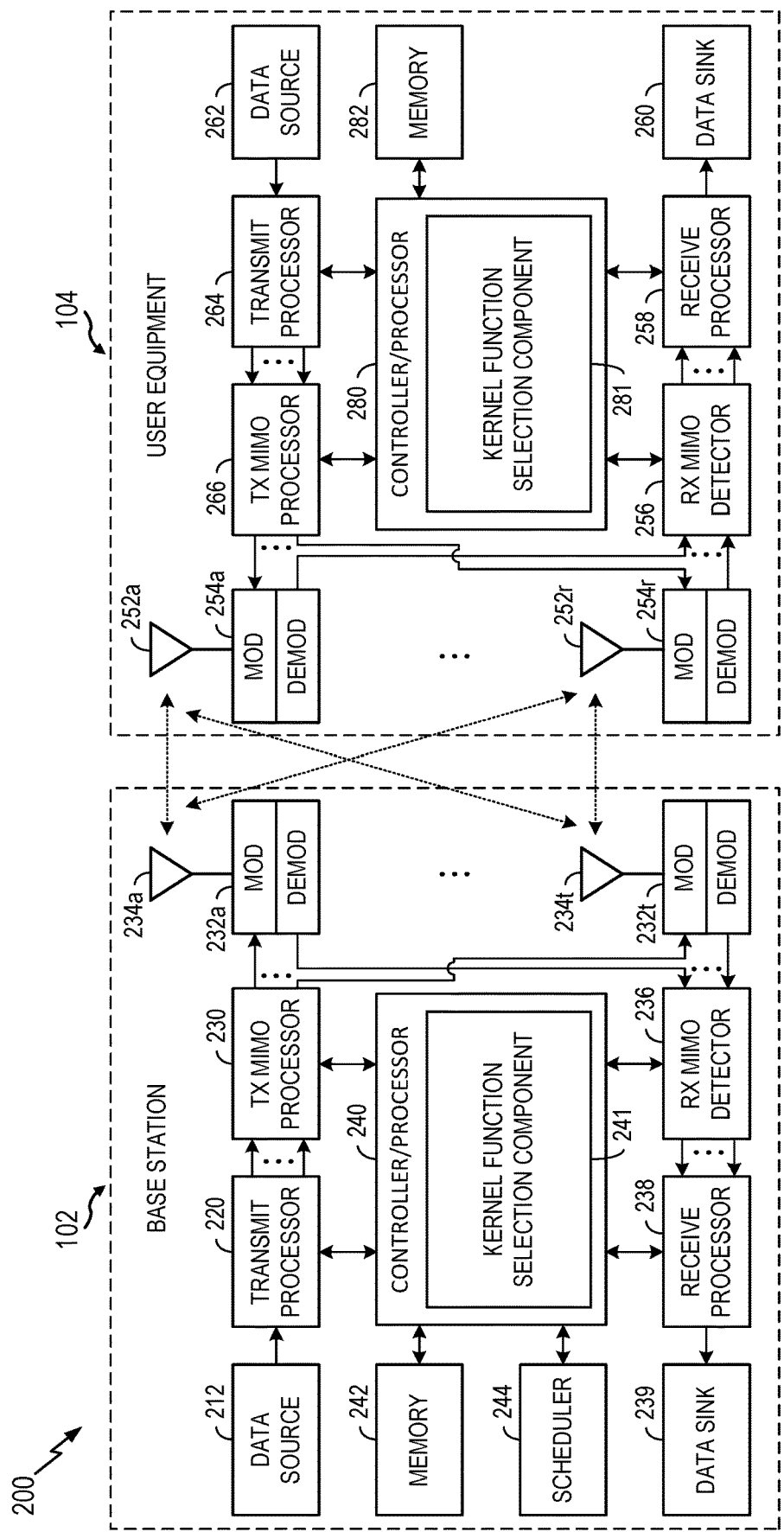
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a kernel function selection component 241, which may be representative of kernel function selection component 199 of FIG. 1. Notably, while depicted as an aspect of controller/processor 240, kernel function selection component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes a kernel function selection component 281, which may be representative of kernel function selection component 198 of FIG. 1. Notably, while depicted as an aspect of controller/processor 280, kernel function selection component 281 may be implemented additionally or alternatively in various other aspects of user equipment 104 in other implementations.

Figure 3:
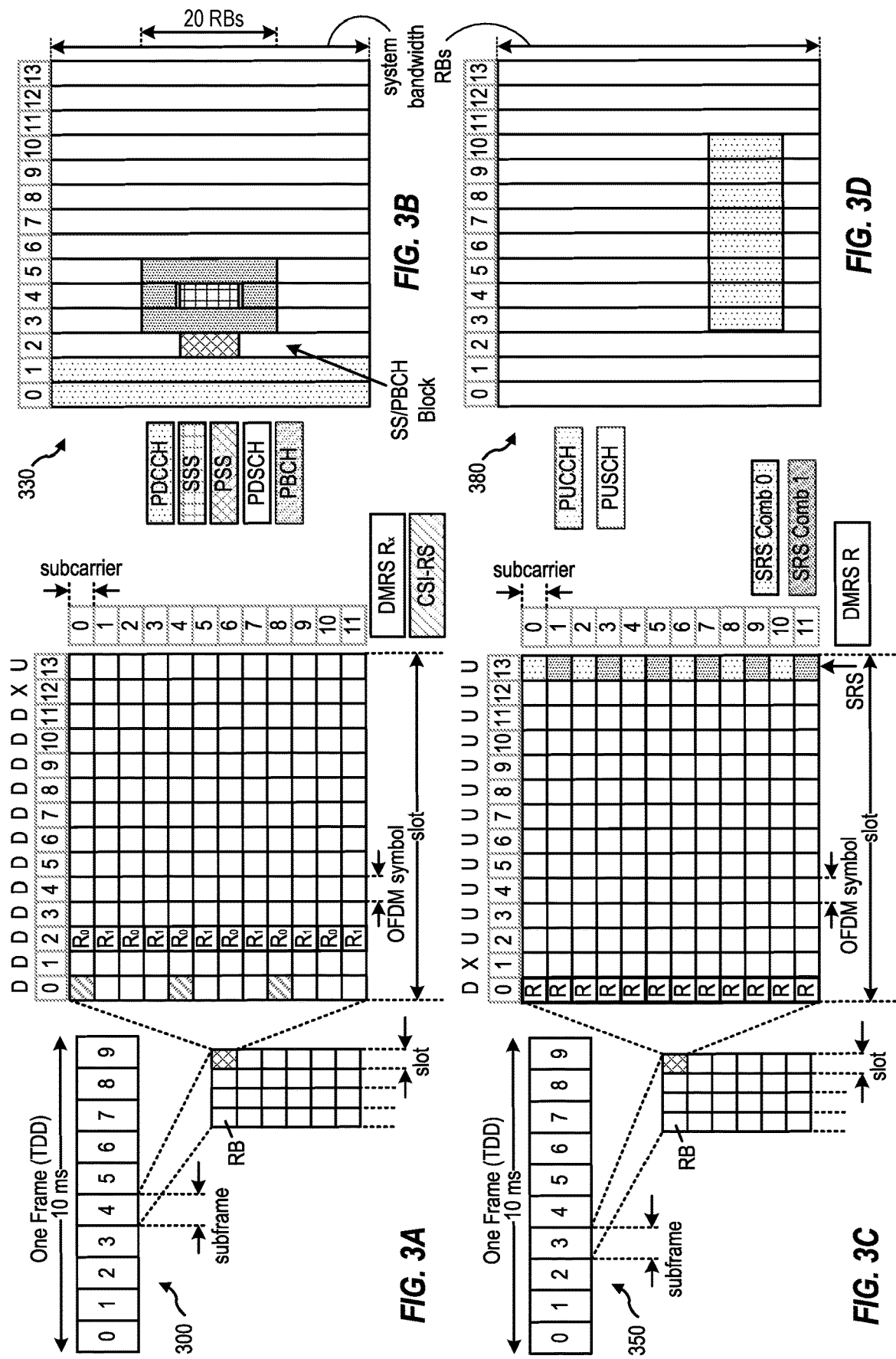
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Transceiver Front-End Circuitry

Figure 4:
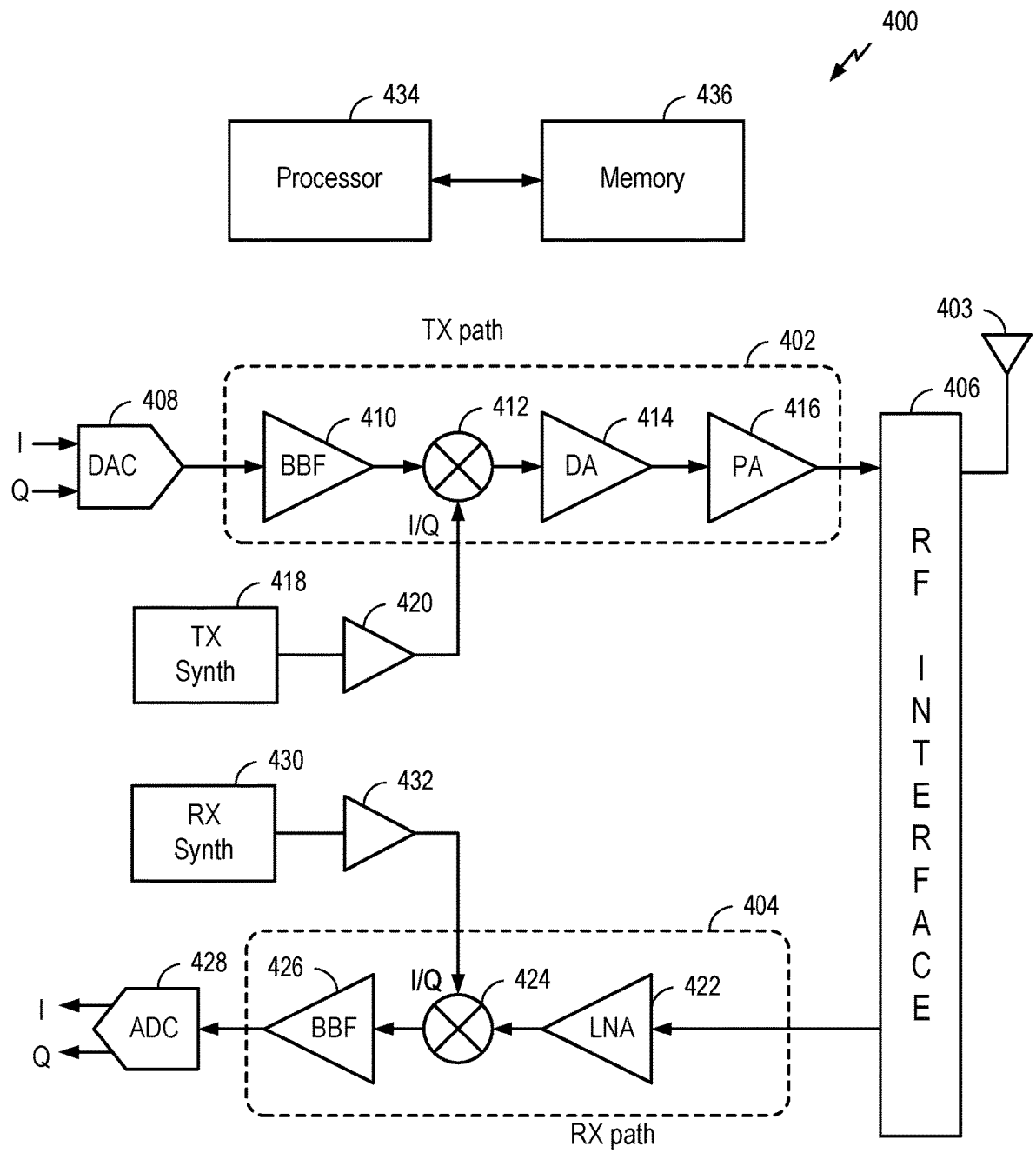
FIG. 4 is a block diagram showing an example transceiver front-end.

FIG. 4 is a block diagram of an example transceiver front-end 400, in accordance with certain aspects of the present disclosure. In some cases, the transceiver front-end 400 may be representative of one or more of the components of the BS 102 or UE 104 shown in FIG. 2, such as TX/RX front-end circuits 232, 254, the antennas 234, 252, and the like. As shown, the transceiver front-end 400 includes at least one transmit (TX) path 402 (also known as a transmit chain) for transmitting signals via one or more antennas and at least one receive (RX) path 404 (also known as a receive chain) for receiving signals via the antennas. When the TX path 402 and the RX path 404 share an antenna 403, the paths may be connected with the antenna via an RF interface 406, which may include any of various suitable RF devices, such as a duplexer, a switch, a diplexer, and the like.

Receiving in-phase (I) or quadrature (Q) baseband analog signals from a digital-to-analog converter (DAC) 408, the TX path 402 may include a baseband filter (BBF) 410, a mixer 412, a driver amplifier (DA) 414, and a power amplifier (PA) 416. The BBF 410, the mixer 412, and the DA 414 may be included in a radio frequency integrated circuit (RFIC), while the PA 416 may be included in the RFIC or external to the RFIC. The BBF 410 filters the baseband signals received from the DAC 408, and the mixer 412 mixes the filtered baseband signals with a transmit local oscillator (LO) signal to convert the baseband signal of interest to a different frequency (e.g., upconvert from baseband to RF). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 412 are typically RF signals, which may be amplified by the DA 414 and/or by the PA 416 before transmission by the antenna 403. In some cases, the PA 416 may have a limited linear dynamic range (DR), which may distort the RF signals due to a high peak-to-average-power-ratio (PAPR). In some cases, these RF signals may be digitally pre-distorted before amplification to help correct for the limited linear DR of the PA 416, known as digital pre-distortion (DPD), as explained in greater detail below.

The RX path 404 may include a low noise amplifier (LNA) 422, a mixer 424, and a baseband filter (BBF) 426. The LNA 422, the mixer 424, and the BBF 426 may be included in a radio frequency integrated circuit (RFIC), which may or may not be the same RFIC that includes the TX path components. RF signals received via the antenna 303 may be amplified by the LNA 422, and the mixer 424 mixes the amplified RF signals with a receive local oscillator (LO) signal to convert the RF signal of interest to a different baseband frequency (i.e., downconvert). The baseband signals output by the mixer 424 may be filtered by the BBF 426 before being converted by an analog-to-digital converter (ADC) 428 to digital I or Q signals for digital signal processing.

While it is desirable for the output of an LO to remain stable in frequency, tuning to different frequencies may indicate using a variable-frequency oscillator, which can involve compromises between stability and tunability. Contemporary systems may employ frequency synthesizers with a voltage-controlled oscillator (VCO) to generate a stable, tunable LO with a particular tuning range. Thus, the transmit LO may be produced by a TX frequency synthesizer 418, which may be buffered or amplified by amplifier 420 before being mixed with the baseband signals in the mixer 412. Similarly, the receive LO may be produced by an RX frequency synthesizer 430, which may be buffered or amplified by amplifier 432 before being mixed with the RF signals in the mixer 424.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beam-formed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Example Over-the-Air Digital Pre-Distortion

Wireless communication devices, such as the BS 102 and UE 104, generally include transmit chains that include non-linear (NL) components such as power amplifiers (PA) (e.g., PA 416) that will distort transmitted radio frequency (RF) signals. For example, such PAs may have a limited linear dynamic range (DR), which may distort the transmitted signal due to a high peak-to-average-power-ratio (PAPR). The non-linear distortions may introduce in-band distortion, which impacts the link performance in terms of mutual information and/or error vector magnitudes (EVM). The non-linear distortions may also introduce out-of-band distortion, which may dictate the amount of adjacent channel interference (ACI). The ACI generally corresponds to how much the adjacent channel is "polluted" by the transmitted signal.

Figure 5:
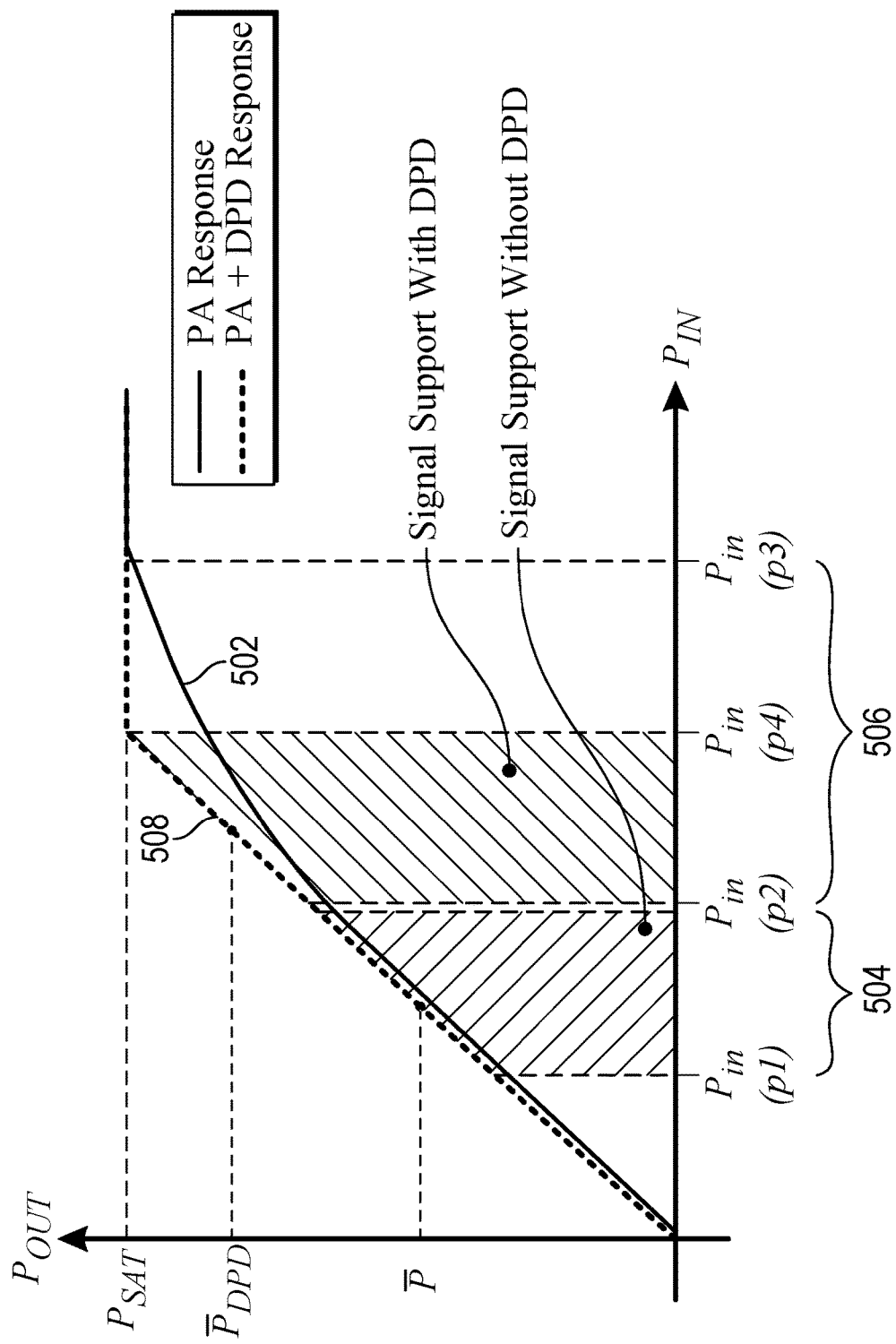
FIG. 5 provides an example power amplifier response curve.

FIG. 5 provides an example PA response curve 502, illustrating the distortion of RF signals by the PA. The example shown in FIG. 5 is a simple illustration of PA distortion that is only dependent on the PA input amplitude (e.g., known as amplitude-amplitude response). However, there could be more-complex PA distortions where amplitude distortion might be dependent on the phase of the input. There could also be PA models with memory where the output of the PA depends on a combination of the current input and some past inputs. The DPD training techniques described herein can help correct for the amplitude distortions as well as these alternative forms of distortions.

As shown, the PA response curve 502 is plotted showing the input power ($P_{in}$) to the PA on the horizontal axis and the output power ($P_{out}$) of the PA on the vertical axis. At p1, the input power ($P_{in}$) of the PA may increase linearly through region 504 until p2. PA response curve 502 through the region 504 between p1 and p2 may be generally linear in that increases in the input power to the PA may result in a corresponding (e.g., linear) increase in the output power of the PA. As the input power continues to increase in region 506 between p2 and p3, the PA response curve 502 may become nonlinear, distorting signals being amplified by the PA. For example, as shown, increases in the input power to the PA in the region 506 may result in a corresponding non-linear increase in the output power of the PA until the PA reaches saturation ($P_{Sat}$) where the output power levels out, remaining constant for any increase in the input power. That is, an increase to the input power of X $P_{in}$ may correspond to an increase in the output power of Y $P_{out}$, where Y may be different from X. Accordingly, the PA configuration of the transmitting device may include both a linear and a nonlinear components, with each component impacting, at least to some degree, channel performance, interference, and the like.

To avoid such non-linearity and distortions, power back-off may be introduced (e.g., to lower the power output below the nonlinear region 506), but this approach has its own limitations. For example, a higher the power back-off may have lower power efficiency for the transmitting device, poorer rate-over-range (e.g., an achievable communication rate at specific path loss/distance from the transmitting device), and coverage.

A complementary or alternative method to power back-off is to use digital pre-distortion (DPD) in the transmitter's digital front-end. Using the DPD, the amount of distortion is maintained in some target level, while the power back-off is reduced to be as low as possible, and hence the PA efficiency is improved.

A DPD procedure may be based on a set of non-linearity coefficients associated with kernel functions, which may be configured to offset or otherwise mitigate the impact of one or more non-linearities associated with transmission circuitry of the base station. For example, a power amplifier (PA) may have non-linear characteristics and thus, absent DPD, may introduce one or more non-linearities into a transmitted signal. In such an example, performing a DPD procedure may include the base station distorting a signal prior to amplifying of the signal via the PA, where the distortions compensate for non-linearities associated with the PA. The base station may then transmit the amplified signal (or a signal based thereon). By performing DPD, the linearity of a signal amplified by the PA may be maintained for a greater range of input powers before the signal amplified by the PA becomes saturated.

For example, FIG. 5 provides a PA response curve 508 associated with the performance of a DPD procedure to correct for signal distortion. As illustrated, at p1, the input power ($P_{in}$) of the PA may increase linearly through region 504 until p2. Further, as illustrated, the PA response curve 508 through the region 504 between p1 and p2 may be linear in that increases in the input power to the PA may result in a corresponding (e.g., linear) increase in the output power of the PA. As the input power continues to increase in region 506 of FIG. 5, the PA response curve 508 remains linear until the PA reaches saturation ($P_{Sat}$) at p4 where the output power levels out, remaining constant for any increase in the input power. As can be seen, while the output power saturates at a lower input power for the PA response curve 508 associated with DPD procedure, the linearity of the PA response curve 508 is maintained for a greater number of input powers as compared to the PA response curve 502 without the DPD procedure.

DPD procedures typically require signal sensing at an RF circuit of the transmitter, such as the TX path 402 of FIG. 4. For example, this approach typically requires a transmitted signal from all PAs and antenna arrays to be received and measured for non-linearity estimation. More specifically, DPD typically requires linking the TX chain (e.g., the TX path 402 of FIG. 4) to an RX feedback chain (e.g., RX path 404 of FIG. 4) to capture the non-linearity and estimate it. DPD works well when there are a small number of antennas used for transmission, such as for sub-6 GHz base stations and user equipments. However, in some wireless communication systems, such as millimeter wave (mmWave), there may be a very high quantity of transmit antenna arrays used by base stations (e.g., multiple spatial streams, transmission ports, beamforming configurations, antenna ports, etc.), with the cost of these TX path to RX path feedback links being very high and, in some examples, impractical. Further, in mmWave, DPD needs to capture distortions on a far-field beam and not per individual PA in order to account for cross coupling PA non-linear effects, the effects of which may not be seen in TX path to RX path link feedback.

Therefore, to avoid the excessive cost of multiple TX path to RX path feedback links, in some cases, a base station may be able to perform DPD training over the air (OTA DPD) with the help of a UE. As discussed above, a goal of DPD training is to determine a set of non-linearity coefficients associated with kernel functions that may be used to pre-distort signals to account for the non-linearity of the PA. For instance, the base station may transmit an indication of one or more training parameters to the UE along with a reference signal, the UE may compute or otherwise determine the non-linearity coefficients based on the reference signal and the one or more training parameters, and the UE may then transmit an indication of the set of non-linearity coefficients to the base station.

In other examples, however, as described herein, a base station may perform DPD training using multiple UEs. For instance, the base station may transmit one or more respective training parameters to each UE of a group of training UEs (e.g., different training parameters to different UEs) along with one or more reference signals to the different training UEs. Each training UE may compute or otherwise determine one or more respective training values based on the respective training parameters for the training UE and the one or more reference signals, and each training UE may transmit its one or more respective training values to the base station. For example, the training values received by the base station from the UEs may be respective sets of intermediate results or other interim information, rather than the non-linearity coefficients themselves, such that the base station may itself compute the non-linearity coefficients based on an aggregation of the information (e.g., training values) from the multiple UEs.

Thus, each training UE of the multiple training UEs may perform relatively fewer or less computationally intense computations compared to a single UE calculating the set of non-linearity coefficients. Further, the DPD training procedure may be associated with a lower latency when multiple UEs calculate one or more training values as compared to a single UE calculating the set of non-linearity coefficients. Further yet, the training UEs may collectively operate over a wider bandwidth (e.g., at least one of the multiple UEs may have a bandwidth that is at least partially non-overlapping in frequency with another of the multiple UEs). Accordingly, the multiple UEs may be associated with a greater bandwidth than a single UE, and thus the set of non-linearity coefficients determined by the base station based on an aggregation of information from across the multiple training UEs may be applicable to a wider bandwidth, to a greater quantity of UEs, or both (e.g., relative to a single-UE approach to DPD training).

Receiving feedback from multiple training UEs may also beneficially reduce the impact of noise on the DPD training. For instance, even if signals sent to the multiple training UEs are impacted by noise, thus impacting the one or more training values provided to a base station by each individual training UE, aggregating (e.g., averaging) the information received from the multiple training UEs may suppress the impact of such noise. These and other benefits described herein are merely exemplary, and one of ordinary skill in the art may appreciate additional or alternative benefits of the teachings herein.

Aspects Related to Over the Air Digital Pre-Distortion Kernel Function Selection As noted above, DPD functionality generally uses a linear combination of non-linear functions called kernel functions. The goal of the OTA DPD training process is to determine the best linear combination of the kernel functions (e.g., coefficients for linearly combining the kernel functions) to compensate for PA non-linearity at a base station. For example, as noted above, the OTA DPD training process involves at least one UE determining a set of non-linearity coefficients based on one or more reference signals and transmitting an indication of the set of non-linearity coefficients to the base station. The non-linearity coefficients, when applied to corresponding kernel functions, may be used to correct for distortions of signals caused by the non-linearity of the PA.

While the OTA DPD training process described above involves the determination of a set of non-linearity coefficients, a complimentary DPD training process may be used select a set of kernel functions for DPD functionality. Kernel functions are generally non-linear functions that may be used to model intermodulation distortion in many devices, including power amplifiers and frequency mixers. By modeling distortion in devices such as power amplifiers, such distortion may be accounted for and corrected, which is a goal of DPD training.

Different kernel functions may exist, such as a truncated Volterra kernel functions, special polynomial Legendre kernel functions, Laguerre kernel functions, orthogonal kernel functions, and the like. In some cases, a goal of the selection of the set of kernel functions may be to obtain optimal DPD performance for a limited number of kernels functions, for example, to reduce DPD functionality complexity at the base station. Additionally, reducing the number of kernels functions (e.g., through kernel function selection) allows improved processing gain in the DPD training process.

In some cases, the non-linearity coefficients may be expected to change frequently over time, such as due to changes in temperature of the PA. The non-linearity coefficients may also change in response to changes in PA input power level, PA input signal bandwidth, a beam forming change (which may impact multiple Pas and their combination when transmitting signals), and the like. In contrast, kernel functions are typically much less sensitive to such changes and, thus, a selected set of kernel functions may be kept constant for longer periods of time. The kernel function selection process can therefore generally be done less frequently than DPD coefficients calculation. However, kernel function selection is much more costly in terms of processing power due to the need for considering a large number of candidate kernels and selecting the best set of kernel functions to reduce PA distortion. Since generally kernel functions are not orthogonal, selecting the best K kernel functions out of N kernel function candidates is non-polynomial (NP)-hard and requires $$\binom{N}{K}$$

hypotheses for optimal kernel function selection, which is processing and power intensive.

Accordingly, aspects of the present disclosure provide techniques for assisting with OTA DPD kernel function selection to help alleviate the processing and power requirements associated therewith. More specifically, such techniques may include selection algorithms that may be used to scan sets of kernel functions and evaluation functions that may be used to select particular kernel functions that provide good performance.

Example Call Flow Illustrating Operations for OTA DPD Kernel Function Selection

FIG. 6 is a call flow diagram illustrating example operations 600 between a BS 602 and a UE 604 for OTA DPD kernel function selection. In some cases, the BS 602 may be an example of the BS 102 illustrated in FIG. 1. Similarly, the UE 604 may be an example of the UE 104 illustrated in FIG. 1. Further, as shown, a Uu interface may be established to facilitate communication between the BS 602 and UE 604, however, in other aspects, a different type of interface may be used.

As shown, the operations 600 illustrated in FIG. 6 begin at 606 with the UE 604 transmitting capability information to the BS 602, indicating a capability of the UE for performing digital pre-distortion (DPD) training. In other words, the UE 604 may transmit information to the BS 602 indicating whether the UE 604 is capable of performing DPD training.

Thereafter, if the UE 604 is capable of the DPD training, the BS 602 may trigger kernel function selection at the UE by transmitting a request at 608 to perform the DPD training, which may be received by the UE 604. In some cases, triggering kernel function selection or DPD training may be a-periodic, semi-persistent, or periodic.

At 610, in response to receiving the request, the UE may perform the DPD training. As illustrated, performing the DPD training may include receiving one or more reference signals (RSs) transmitted by the BS 602 at 612 and selecting, based on the one or more RSs, an ordered set of kernel functions at 614. In some cases, the DPD training may be performed at a first periodicity, which is longer than a second periodicity at which DPD training is performed for calculating coefficients for kernel functions in the ordered set of kernel functions.

In some cases, the one or more RSs may include at least one RS used to measure or quantify a non-linear response of PA configuration of the BS 602, known as a non-linear reference signal (NL-RS). Broadly, a PA configuration generally corresponds to a specific configuration of the RF architecture of the transmitting device. For example, a PA configuration may generally correspond to a specific transmit chain (e.g., including oscillator(s), PA(s), filter(s), switch(es), etc.), a spatial stream, a specific transmission port, a specific beamforming configuration (e.g., antenna array, beamforming direction, beamforming angle, antenna port, etc.), and the like.

In some aspects, NL-RS may be different than other reference signals transmitted within a wireless communication system. One difference may include each NL-RS being associated with, or otherwise corresponding to, a specific PA configuration of the transmitting device. Another difference may include each NL-RS may not be a precoded signal.

Accordingly, the BS 602 may then transmit an NL-RS over a subset of the frequency bands (e.g., over a smaller bandwidth) used for communications between the BS 602 and the UE 604. The UE 604 may measure, identify, or otherwise determine a non-linear estimation measurement associated with the PA configure based at least on the NL-RS. For example, UE 210 may measure the signal strength over time of the NL-RS to determine the channel estimation measurement and the non-linear estimation measurement. Broadly, the non-linear estimation measurement may generally identify or correspond to the nonlinear response of the PA configuration. For example, the non-linear estimation measurement may identify the non-linear response portion of PA response 502 of FIG. 5 extending between the p2 and p3.

Accordingly, based on the one or more reference signals (e.g., and the non-linear measurements), the UE 604 may select an ordered set of kernel functions at 614. The ordered set of kernel functions may comprise non-linear functions configured to reduce the distortion of signals transmitted by the BS 602 caused by non-linearity of the PA of the BS 602. In some cases, the UE 604 may select the ordered set of kernel functions from a plurality of kernel functions based on a selection algorithm and an evaluation function configured to generate an error metric associated with the ordered set of kernel functions. Thereafter, the UE 604 may transmit feedback information at 616 indicating the ordered set of kernel functions, which may be received by the BS 602. The BS 602 may then adjust, at 618, one or more kernels associated with the PA of the BS 602 based on the ordered set of kernel functions to reduce the distortion of the signals transmitted by the BS 602.

Figure 7:
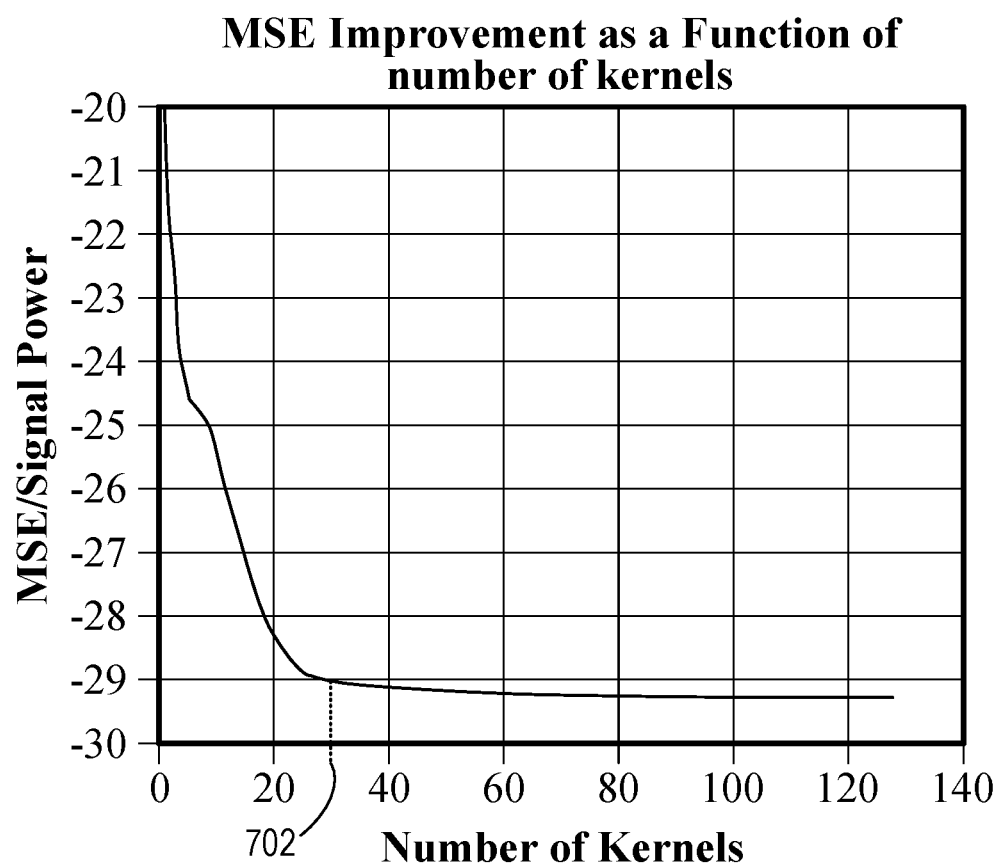
FIG. 7 is a plot diagram, illustrating a tradeoff between the number of selected kernels and a corresponding error metric.

Generally, as the number of kernel functions included in the ordered set of kernel functions increases, DPD performance improves, which reduces signal distortion by the PA. Stated otherwise, as the number of kernel functions included in the ordered set of kernel functions increases, an error metric associated with the PA may decrease. However, at a certain point, the error metric associated with the PA may begin to level out regardless of the number of kernel functions included in the ordered set of kernel functions, as depicted in FIG. 7 and described further below. Accordingly, because kernel function selection is both processing and power intensive, the selection algorithm and the evaluation function may be used by the UE 604 to determine the best set of kernel functions for a given threshold error metric such that the UE 604 does not needlessly continually select kernel functions that only minimally reduce the error metric.

FIG. 7 is a plot diagram 700, illustrating a tradeoff between the number of selected kernels and a corresponding error metric. In FIG. 7, the number of kernel functions is shown along the X-axis while the error metric (e.g., a ratio of mean squared error (MSE) to signal power) is shown along the Y-axis, which may be measured in decibels (dB) (e.g., $10*\log_{10}((MSE/\text{signal power}))$. Here, the ratio of MSE to signal power may provide an indication of a quality or performance of the PA (e.g., the linearity of a response of the PA). Lower MSE levels may indicate better quality or performance of the PA.

For example, as shown, as the number of kernel functions increases the error metric, or the ratio of MSE to signal power, may decrease, indicating better performance associated with the PA of the BS 602. However, at about 30 kernel functions, as illustrated at 702, the ratio of MSE to signal power begins to level out and remain constant no matter how many additional kernel functions are added. For example, as shown, between 30 and 130 kernel functions, the ratio of MSE to signal power remains relatively constant at about −29. Accordingly, as noted above, the selection algorithm and the evaluation function may be used by the UE 604 to determine the best set of kernel functions for a given threshold error metric such that the UE 604 does not needlessly continually select kernel functions that only minimally reduce the error metric. As an example, with reference to FIG. 7, an optimal ordered set of kernel functions would be around 30 kernel functions (e.g., resulting in an MSE of about −29) as any additional kernel functions would not decrease the MSE by a significant amount and would result in unnecessary processing and power expenditure by the UE 604.

Returning now to FIG. 6, at 614, the UE 604 may select the ordered set of kernel functions based on the one or more RSs, which may be based on the selection algorithm and the evaluation function as described above. In some cases, as shown at 611, the BS 602 may optionally transmit DPD training configuration information that may be received by the UE 604 and used by the UE 604 to perform the DPD training and kernel function selection. For example, in some cases, the DPD training configuration information may include an indication of the plurality of kernel functions, N, from which to select the ordered set of kernel functions, K. Additionally, in some cases, the DPD training configuration information may include an indication of a threshold number of kernel functions as well as an indication a threshold error metric.

In some cases, the UE 604 may perform the selection algorithm at 614 to select the ordered set of kernel functions from the indicated plurality of kernel functions based, at least in part, on the evaluation function. The selection algorithm may indicate to the UE 604 the manner or order the UE 604 should evaluate the plurality of kernel functions based on the evaluation function to select the ordered set of kerned functions. For example, when performing the selection algorithm, the UE 604 may evaluate kernel functions in the plurality of kernel functions indicated by the BS 602 in a particular order indicated by the selection algorithm and select those kernel functions that satisfy the error metric generated by the evaluation function. In some cases, the UE 604 may perform the selection algorithm until the threshold number of kernel functions have been selected or the threshold error metric has been reached. Additional details regarding the evaluation function will be described below.

Aspects Related to Selection Algorithms

In some cases, the BS 602 may provide an indication of the particular selection algorithm for the UE 604 to use when selecting the ordered set of kernel functions in block 614 of FIG. 6. For example, this indication may be provided in the DPD training configuration information transmitted by the BS at 611. The UE may then select the ordered set of kernel functions at 614 based on the indication of the particular selection algorithm.

The particular selection algorithm indicated by the BS 602 may be one or more of a number of different selection algorithms. For example, in some cases, one selection algorithm may be to exhaustively evaluate all $$\binom{N}{K}$$

kernel function hypotheses. However, such selection algorithm would require significant processing and power resources, and may be prohibitive for the UE 604 to perform.

Accordingly, other selection algorithms may be used to reduce such processing and power requirements. For example, in some cases, the particular selection algorithm indicated by the BS 602 may include a greedy forward selection algorithm. In such cases, the UE 602 may perform the greedy forward selection algorithm on the plurality of kernel functions to add kernel functions, from the plurality of kernel functions, to the ordered set of kernel functions, based on the evaluation function. As noted, the UE 604 may perform the greedy forward selection algorithm to add kernel functions to the ordered set of kernel functions until the ordered set of kernel functions includes the threshold number of kernel functions or the error metric associated with the ordered set of kernel functions reaches the threshold error metric.

In some cases, the greedy forward selection algorithm may include progressively evaluating and selecting kernel functions, from the plurality of kernel functions, to include in the ordered set of kernel functions starting with a linear kernel function in the plurality of kernel functions and progressing to non-linear kernel functions in the plurality of kernel functions. More specifically, the UE 604 may individually consider each kernel function in the plurality of kernel functions based on the evaluation function and may select those individually considered kernel functions from the plurality of kernel functions that, when added to the ordered set of kernel functions at each iteration of the greedy forward selection algorithm, minimize the error metric associated with the ordered set of kernel functions.

In other words, the UE 604 may first determine a first kernel function of the plurality of kernel functions (e.g., starting with a linear kernel function and progressing to non-linear kernel functions) that minimizes the error metric the most when added to the ordered set of kernel functions. The UE 604 may then add the first kernel function to the ordered set of kernel functions. The UE 604 may then determine a second kernel function of the plurality of kernel function that, from the remaining kernel functions of the plurality of kernel functions, again minimizes the error metric associated with ordered set of kernel functions the most. The UE 604 may then add the second kernel function to the ordered set of kernel functions. This process may continue, as noted above, until the ordered set of kernel functions includes the threshold number of kernel functions or the error metric associated with the ordered set of kernel functions reaches (or decreases below) the threshold error metric.

In some cases, the particular selection algorithm indicated by the BS 602 and performed by the UE 604 in block 614 may include a greedy backward selection algorithm. For example, when performing the greedy backward selection algorithm, the UE 604 may add the plurality of kernel functions to the ordered set of kernel functions and may thereafter remove kernels from the ordered set of kernel functions, based on the evaluation function, until the ordered set of kernel functions includes the threshold number of kernel functions or the error metric associated with the ordered set of kernel functions reaches the threshold error metric.

More specifically, when performing the greedy backward selection algorithm, the UE 604 may add all kernel functions of the plurality of kernel functions to the ordered set of kernel functions any may progressively remove kernel functions from the ordered set of kernel functions, at each iteration of the greedy backward selection algorithm, that contribute the least to minimizing the error metric. In other words, the UE 604 may first determine a first kernel function in the ordered set of kernel functions that contributes the least to minimizing the error metric (e.g., the error metric is increased the least, out of all remaining kernel functions in the ordered set of kernel functions, when the first kernel function is removed) and may then remove the first kernel function from the ordered set of kernel functions. The UE 604 may then determine a second kernel function of the plurality of kernel function that, from the remaining kernel functions in the ordered set of kernel functions, again contributes least to minimizing the error metric and may remove the second kernel function from the ordered set of kernel functions. This process may continue, as noted above, until the ordered set of kernel functions includes the threshold number of kernel functions or the error metric associated with the ordered set of kernel functions reaches (or increases above) the threshold error metric.

In some cases, the particular selection algorithm indicated by the BS 602 may include a batch greedy forward selection algorithm or batch greedy backward selection algorithm. The batch greedy forward selection algorithm may be similar to the greedy forward selection algorithm, except that, at each iteration of the batch greedy forward selection algorithm, several kernel functions (e.g., a batch) are added to the ordered set of kernel functions. Similarly, the batch greedy backward selection algorithm may be similar to the greedy backward selection algorithm, except that, at each iteration of the batch greedy backward selection algorithm, several kernel functions are removed from the ordered set of kernel functions.

In some cases, the particular selection algorithm indicated by the BS 602 and performed by the UE 604 in block 614 may include a combined greedy forward and backward selection algorithm. For example, when performing the combined greedy forward and backward selection algorithm, the UE 604 may first perform the greedy forward selection algorithm to select the ordered set of kernel functions. Thereafter, the UE 604 may then perform the greedy backward selection algorithm to remove redundant kernel functions (e.g., kernel functions that contribute the least to minimizing the error metric).

More specifically, for example, when performing the combined greedy forward and backward selection algorithm, the UE 604 may first perform the greedy forward algorithm on the plurality of kernel functions to add kernel functions, from the plurality of kernel functions, to the ordered set of kernel functions, based on the evaluation function, until the error metric associated with the ordered set of kernel functions reaches the threshold error metric. Thereafter, the UE 604 may perform the greedy backward algorithm on the ordered set of kernel functions to remove kernels from the ordered set of kernel functions, based on the evaluation function, until the ordered set of kernel functions includes the threshold number of kernel functions.

Aspects Related to Evaluation Functions

As noted above, when performing the selection algorithm in block 614, the UE 604 may evaluate kernel functions in the plurality of kernel functions indicated by the BS 602 in a particular order indicated by the selection algorithm and select those kernel functions that satisfy the error metric generated by the evaluation function. The evaluation function may be configured to generate an error metric associated with the ordered set of kernel functions based on one or more inputs. In some cases, the evaluation function may be used to model DPD functionality and PA response of the BS 602 with respect to DPD quality or performance, which the UE may solve as an optimization problem for different inputs.

Figure 8:
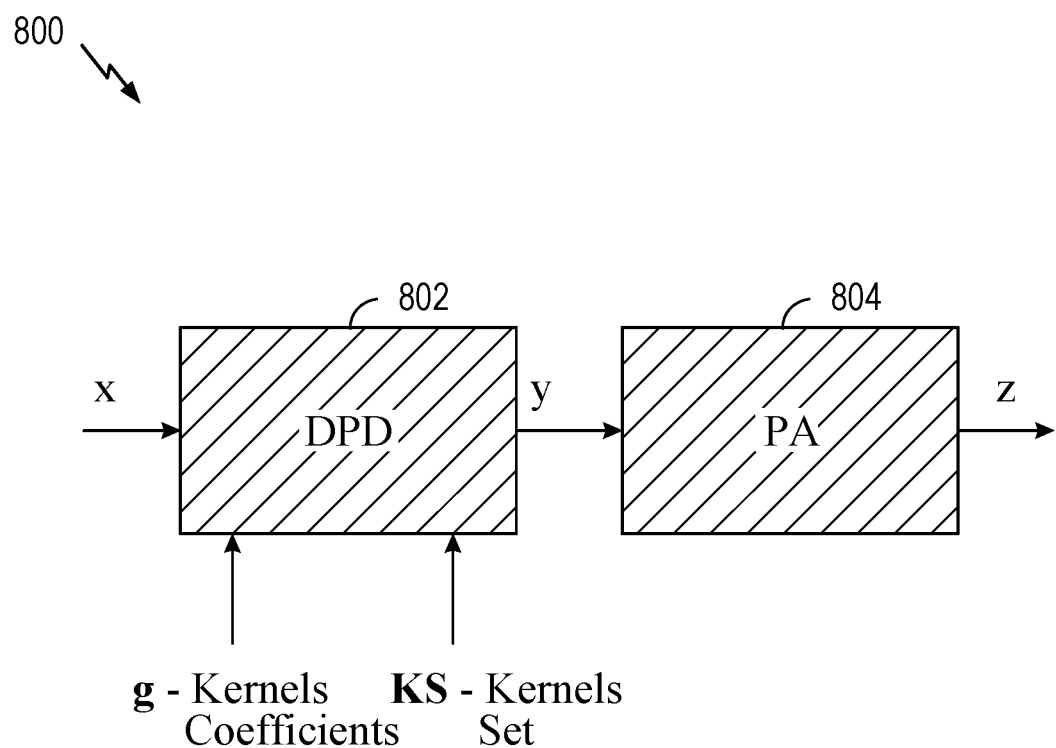
FIG. 8 provides an illustration of digital pre-distortion functionality and power amplifier response model.

FIG. 8 provides an illustration of the DPD functionality and PA response model 800 of the BS 602 of FIG. 6. As shown, the model 800 may include a DPD functionality block 802 and a power amplifier (PA) block 804. The DPD functionality block 802 may include several inputs, such as the input signal x, a set of kernel function coefficients (g), and an ordered set of kernel functions (KS). The input signal x may be transformed based on g and KS to generate a pre-distorted output signal y, which may be fed into the PA block 804. The pre-distorted output signal y may therefore by represented as the function of the DPD functionality block 802 that takes into account x, g, and KS or y=DPD(x, g, KS). The PA block 804 may amplify the pre-distorted output signal y and generate another output signal z for transmission. Similarly, the output signal z may be represented as the function of the PA block 804 that takes into account y or z=PA(y).

Accordingly, the goal of DPD training may be to determine the ordered set of kernel functions (KS) that provides the best output signal z (e.g., least distorted as measured by an error metric). To accomplish this, the UE 604 may use an evaluation function to evaluate kernel functions (e.g., according to one or more of the selection algorithms described above) and select the kernel functions to include in the ordered set of kernel functions until a threshold error metric associated with the ordered set of kernel functions is reached. In some cases, the evaluation function may be used to determine how well DPD can linearize a combination of the DPD functionality block 802 and the PA block 804.

In some cases, different evaluation functions may be used by the UE 604 to evaluate and select kernel functions for the ordered set of kernel functions. In some cases, the BS may transmit an indication of the evaluation function for the UE 604 to use, such as in the DPD training configuration information 611 shown in FIG. 6. In some cases, the evaluation function may include Equation 1, below.

$$\text{metric}(KS) = \min_{g} \|A(DPD(z, g, KS) - x\|^2 \qquad (1)$$

Equation 1 may result in a linear set of equations for g which is relatively easy to evaluate. As shown, equation 1 involves a norm function and takes into account the transformation matrix A, the input signal x, and the DPD function with inputs of z, g, and KS. In some cases, the transformation matrix A might be used to convert a time domain vector to a frequency domain and then emphasize certain spectral components (e.g., in band or out of band spectral components). Alternatively, the transformation matrix A could be a forgetting factor making the error metric ready for per sample sequential processing. More generally, the transformation matrix A can be any suitable linear transformation matrix. In some cases, the BS 602 may provide an indication to the UE 604 (e.g., within the DPD training configuration information transmitted at 611 of FIG. 6) of the transformation matrix A or parameters for generating the transformation matrix A (e.g., a spectral relative weight).

Equation 1 may be used by the UE 604 of FIG. 6 to generate an error metric, such as mean squared error (MSE), for a given ordered set of kernel functions (KS). Accordingly, when evaluating kernel functions to include in the ordered set of kernel functions, the UE 604 may select to add those kernel functions that continually (but significantly) reduce the MSE (e.g., in the case of the greedy forward selection algorithm) or to remove those kernel functions that contribute the least to minimizing the MSE (e.g., in the case of the greedy backward selection algorithm).

More generally, Equation 1 may be used to determine a DPD function (e.g., the ordered set of kernel functions) that may account for, or mitigate, the impact of the PA block 804. That is, if the PA block 804 were to take the input x as the input to the PA block 804, Equation 1 may be used to determine a DPD function that transforms the output signal z of the PA block 804 back to the input signal x. However, because the DPD functionality block 802 is located before the PA block 804, Equation 1 is only able to provide an approximated DPD function to account for the distortions of the PA block 804 (e.g., since the DPD functionality block 802 does not take the output signal z from the PA block 804 as an input). Therefore, in some cases, to provide better or more accurate performance, Equation 2, below, may be used as the evaluation function.

$$\text{metric}(KS) = \min_{g} \|A(x - PA(DPD(x, g, KS)))\|^2 \quad (2)$$

As can be seen, Equation 2 may take into account similar inputs as Equation 1. However, Equation 2 may be used to determine a DPD function such that, when the input signal x is passed through both the DPD functionality block 802 and then passed through the PA block 804, the output signal z of the PA block 804 is transformed back to the input signal x. More specifically, because Equation 2 takes into account the PA response of PA function of the PA block 804, Equation 2 is able to provide a DPD function that more accurately accounts for the distortions caused by the PA block 804 (e.g., as opposed to providing only an approximated DPD function) even though the DPD functionality block 802 is located before the PA block 804. As a result, Equation 2 provides a set of non-linear equations for g that may increase computational complexity at the UE 604, but provides better and more accurate performance.

Additional Aspects Related to OTA DPD Training

Returning to FIG. 6, in some cases, the BS 602 may provide an indication to the UE 604 (e.g., in the DPD training configuration information transmitted at 611) of one or more kernel functions to include in the ordered set of kernel functions. In such cases, when performing the selection algorithm and evaluating kernel functions to include in the ordered set of kernel functions, the UE 604 need not evaluate or select the kernel functions indicated by the BS 602. Moreover, in such cases, the UE 604 also need not include the kernel functions indicated by the BS 602 in the feedback information transmitted to the BS 602 at 616 of FIG. 6.

In some cases, the kernel function selection described above could be performed in different stages to reduce the computational complexity at the UE 604. For example, in some cases, the BS 602 may decide to trigger the DPD training at the UE 604 while maintaining some level of DPD functionality (e.g., that is transparent to the UE 604) when transmitting the one or more reference signals at 612. By using some level of DPD functionality at the BS 602, the complexity of the kernel function evaluation and selection may be reduced. For example, when performing the kernel function evaluation and selection, the UE 604 may "see" an effective PA response whose performance (e.g., error metric) may be better compared to when no DPD functionality is used at the BS 602.

Thus, evaluating and selecting kernel functions for the ordered set of kernel functions may be less complex as the PA response is better due to the DPD functionality being applied. In some cases, the BS 602 may use these techniques (e.g., applying some level of DPD functionality when performing DPD training) to successively refine the DPD functionality. For example, after receiving the feedback information at 616 in FIG. 6, the BS 602 could transmit another request to the UE 604 to perform the DPD training again to further refine the kernel functions of the power amplifier of the BS that were adjusted in block 618. By successively refining the DPD functionality, the BS 602 may reduce the complexity associated with performing the DPD training (e.g., evaluating and selecting kernel functions) by spreading the complexity (and thereby the associated processing and power requirements at the UE 604) across successive iterations.

In some cases, the BS 602 may optionally trigger dedicated measurements at the UE 604 to determine whether the kernel function selection process was successful and resulted in adequate DPD performance in the BS 602. For example, as illustrated at 620 in FIG. 6, the BS 602 may transmit an indication to the UE 604 to perform distortion measurements on one or more transmissions from the BS 602. Thereafter, at 622, the BS 602 may transmit the one or more transmissions to the UE 604 based on the indication to perform the distortion measurements. In some cases, the one or more transmissions may comprise reference signals pre-known or pre-configured at the UE 604.

Further, as shown at 624, the UE 604 may then perform the distortion measurements on the one or more transmissions from the BS 602 and, at 626, may transmit an indication of the distortion measurements to the BS 602. In some cases, the BS 602 may determine, based on the distortion measurements, that the DPD training was successful and may discontinue the DPD training with the UE 604 based on the determination that the DPD training was successful.

In some cases, the BS 602 could trigger multiple UEs to perform the DPD training and kernel function selection. For example, in some cases, at 608 in FIG. 6, the BS 602 may transmit the request to perform the DPD training not only to the UE 604, but also to additional UEs. Accordingly, based on the request to perform the DPD training, these additional UEs may also perform kernel function selection to determine additional ordered sets of kernel functions. The BS 602 may then receive additional feedback information from at least one of the additional UEs indicating another ordered set of kernel functions. The BS 602 may then generate a unique ordered set of kernel functions based on the ordered set of kernel functions and the other ordered set of kernel functions and may adjust, at 618 in FIG. 6, the one or more kernels associated with the power amplifier of the BS 602 based on the unique ordered set of kernel functions. In some cases, generating the unique ordered set of kernel functions may include combining the kernel functions from the ordered set of kernel functions received from the UE 604 with the other ordered set of kernel functions received from the additional UE. In other cases, generating the unique ordered set of kernel functions may include averaging the kernel functions from the ordered set of kernel functions received from the UE 604 and the other ordered set of kernel functions received from the additional UE.

Example Methods for OTA DPD Kernel Function Selection

FIG. 9 is a flow diagram illustrating example operations 900 for wireless communication, in accordance with certain aspects of the present disclosure. The operations 900 may be performed, for example, by a UE (e.g., such as the UE 104 in the wireless communication network 100 of FIG. 1) for performing OTA DPD kernel function selection. The operations 900 may be complementary to the operations 900 performed by the BS. The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 begin, in block 910, with transmitting capability information to a base station (BS), indicating a capability of the UE for performing digital pre-distortion (DPD) training.

In block 920, the UE receives, based on the capability information, a request from the BS to perform the DPD training.

In block 930, the UE performs, based on the received request, the DPD training. In some cases, performing the DPD training may include, for example, the UE receiving, in sub-block 932 one or more reference signals (RSs) and selecting, based on the one or more RSs, an ordered set of kernel functions in sub-block 934.

Thereafter, in block 940, the UE transmits feedback information to the BS indicating the ordered set of kernel functions.

In some cases, selecting the ordered set of kernel functions in block 934 comprises selecting the ordered set of kernel functions from a plurality of kernel functions based on a selection algorithm and an evaluation function configured to generate an error metric associated with the ordered set of kernel functions. In some cases, the ordered set of kernel functions comprise non-linear functions configured to reduce the distortion of signals transmitted by the BS caused by non-linearity of a power amplifier of the BS. In some cases, the evaluation function involves a norm function and a linear transformation matrix, and the error metric may include a mean squared error (MSE). In some cases, the operations 900 may further include receiving, from the BS, an indication of the evaluation function.

In some cases, the operations 900 may further include receiving, from the BS, an indication of the plurality of kernel functions from which to select the ordered set of kernel functions.

In some cases, the operations 900 may further include performing the selection algorithm until a threshold number of kernel functions have been selected or a threshold error metric has been reached.

In some cases, the operations 900 may further include receiving an indication of the threshold number of kernel functions to include in the ordered set of kernel functions.

In some cases, the operations 900 may further include receiving an indication of the selection algorithm to use to select the ordered set of kernel functions, wherein performing the selection algorithm is based on the received indication.

In some cases, performing the selection algorithm comprises performing a greedy forward algorithm on the plurality of kernel functions to add kernel functions, from the plurality of kernel functions, to the ordered set of kernel functions, based on the evaluation function, until the ordered set of kernel functions includes the threshold number of kernel functions or the error metric associated with the ordered set of kernel functions reaches the threshold error metric.

In some cases, performing the selection algorithm comprises adding the plurality of kernel functions to the ordered set of kernel functions and performing a greedy backward algorithm on the plurality of kernel functions to remove kernels from the ordered set of kernel functions, based on the evaluation function. In some cases, the greedy backward algorithm may be performed by the UE until the ordered set of kernel functions includes the threshold number of kernel functions or the error metric associated with the ordered set of kernel functions reaches the threshold error metric.

In some cases, performing the selection algorithm comprises performing a greedy forward algorithm on the plurality of kernel functions to add kernel functions, from the plurality of kernel functions, to the ordered set of kernel functions, based on the evaluation function, until the error metric associated with the ordered set of kernel functions reaches the threshold error metric. Thereafter, the UE may perform a greedy backward algorithm on the ordered set of kernel functions to remove kernels from the ordered set of kernel functions, based on the evaluation function, until the ordered set of kernel functions includes the threshold number of kernel functions.

In some cases, the operations 900 may further include receiving, from the BS, an indication of one or more kernel functions to include in the ordered set of kernel functions, wherein the feedback information transmitted to the BS indicating the ordered set of kernel functions in block 940 does not include an indication of the one or more kernel functions indicated by the BS.

FIG. 10 is a flow diagram illustrating example operations 1000 for wireless communication. The operations 1000 may be performed, for example, by a BS (e.g., such as the BS 102 in the wireless communication network 100 of FIG. 1) for performing OTA DPD kernel selection. The operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 begin, at 1010, with receiving capability information from a user equipment (UE), indicating a capability of the UE for performing digital pre-distortion (DPD) training.

In block 1020, the BS transmits, based on the capability information, a request to the UE to perform the DPD training.

In block 1030, the BS transmits, based on the request, one or more reference signals to the (RS) for performing the DPD training.

In block 1040, the BS receive, based on the one or more RSs, feedback information from the UE indicating an ordered set of kernel functions.

In block 1050, the BS adjusts one or more kernels associated with a power amplifier of the BS based on the ordered set of kernel functions to reduce the distortion of the signals transmitted by the BS.

In some cases, operations 1000 may further include transmitting, to the UE, an indication of a plurality of kernel functions from which to select the ordered set of kernel functions. In some cases, the ordered set of kernel functions comprise non-linear functions.

In some cases, operations 1000 may further include transmitting an indication of a threshold number of kernel functions to include in the ordered set of kernel functions.

In some cases, operations 1000 may further include transmitting, to the UE, an indication of a selection algorithm to use to select the ordered set of kernel functions based on an evaluation function configured to generate an error metric associated with the ordered set of kernel functions. In some cases, operations 1000 may further include transmitting, to the UE, an indication of the evaluation metric. In some cases, evaluation function involves a norm function and a linear transformation matrix.

In some cases, the indication of the selection algorithm indicates to perform a greedy forward algorithm on the plurality of kernel functions to add kernel functions, from the plurality of kernel functions, to the ordered set of kernel functions, based on the evaluation function, until the ordered set of kernel functions includes the threshold number of kernel functions or the error metric associated with the ordered set of kernel functions reaches the threshold error metric.

In some cases, the indication of the selection algorithm indicates to add the plurality of kernel functions to the ordered set of kernel functions and perform a greedy backward algorithm on the plurality of kernel functions to remove kernels from the ordered set of kernel functions, based on the evaluation function, until the ordered set of kernel functions includes the threshold number of kernel functions or the error metric associated with the ordered set of kernel functions reaches the threshold error metric.

In some cases, the indication of the selection algorithm indicates to perform a greedy forward algorithm on the plurality of kernel functions to add kernel functions, from the plurality of kernel functions, to the ordered set of kernel functions, based on the evaluation function, until the error metric associated with the ordered set of kernel functions reaches the threshold error metric and perform a greedy backward algorithm on the ordered set of kernel functions to remove kernels from the ordered set of kernel functions, based on the evaluation function, until the ordered set of kernel functions includes the threshold number of kernel functions.

In some cases, the operations 1000 may further include transmitting, to the UE, an indication of one or more kernel functions to include in the ordered set of kernel functions, wherein the feedback information received from the UE indicating the ordered set of kernel functions does not include an indication of the one or more kernel functions indicated by the BS.

In some cases, the operations 1000 may further include transmitting another request to the UE to perform the DPD training to further refine the adjusted kernel functions of the power amplifier of the B S.

In some cases, the operations 1000 may further include transmitting an indication to the UE to perform distortion measurements on one or more transmissions from the B S, transmitting the one or more transmissions to the UE based on the indication to perform the distortion measurements, receiving an indication of the distortion measurements from the UE, determining, based on the distortion measurements, that the DPD training was successful, and discontinuing the DPD training with the UE based on the determination that the DPD training was successful.

In some cases, the operations 1000 may further include receiving additional feedback information from at least one additional UE indicating another ordered set of kernel functions and generating a unique ordered set of kernel functions based on the ordered set of kernel functions and the other ordered set of kernel functions, wherein adjusting one or more kernels associated with the power amplifier of the BS is based on the unique ordered set of kernel functions.

In some cases, the DPD training for receiving the indication of the ordered set of kernel functions is performed at a first periodicity, which is longer than a second periodicity at which DPD training is performed for calculating coefficients for kernel functions in the ordered set of kernel functions.

Example Wireless Communication Devices

Figure 11:
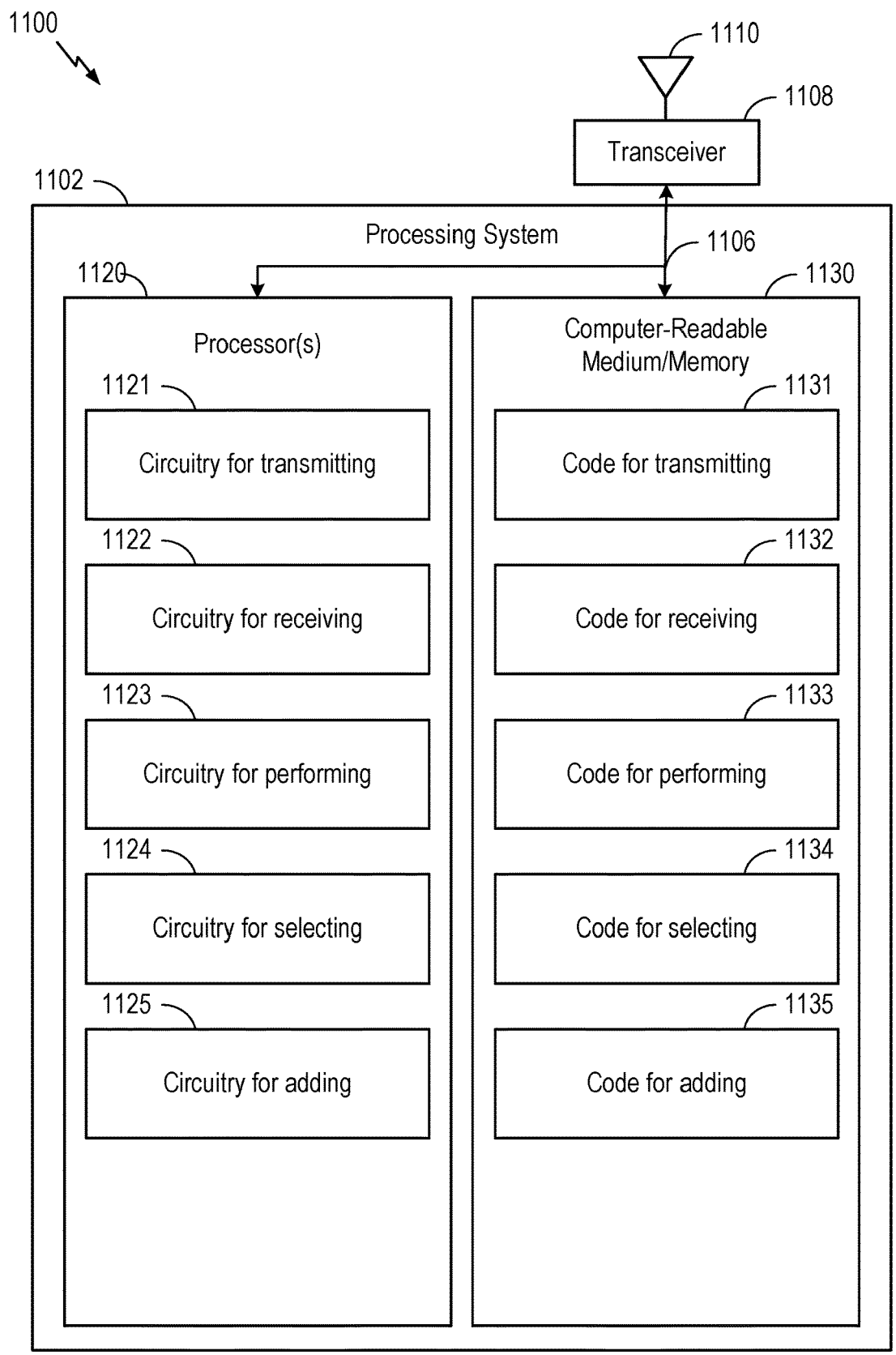
FIGS. 11 and 12 depict aspects of an example communications devices.

FIG. 11 depicts an example communications device 1100 that includes various components operable, configured, or adapted to perform operations for the techniques disclosed herein, such as the operations depicted and described with respect to FIGS. 6 and 9. In some examples, communication device 1100 may be a user equipment 104 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1120 via a bus 1106. In certain aspects, computer-readable medium/memory 1120 is configured to store instructions (e.g., computer-executable code) that when executed by the one or more processors 1120, cause the one or more processors 1120 to perform the operations illustrated in FIGS. 6 and 9, or other operations for performing the various techniques discussed herein for OTA DPD kernel function selection.

In the depicted example, computer-readable medium/memory 1130 stores code 1131 for transmitting, code 1132 for receiving, code 1133 for performing, code 1134 for selecting, and code 1135 for adding.

In the depicted example, the one or more processors 1120 include circuitry configured to implement the code stored in the computer-readable medium/memory 1120, including circuitry 1121 for transmitting, circuitry 1122 for receiving, circuitry 1123 for performing, circuitry 1124 for selecting, and circuitry 1125 for adding.

Various components of communications device 1100 may provide means for performing the methods described herein, including with respect to FIGS. 6 and 9.

In some examples, means for transmitting or sending (or means for outputting for transmission) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving (or means for obtaining) may include the transceivers 254 and/or antenna(s) 252 of the user equipment 104 illustrated in FIG. 2 and/or transceiver 1108 and antenna 1110 of the communication device 1100 in FIG. 11.

In some examples, means for performing, means for selecting, and means for adding may include various processing system components, such as: the one or more processors 1120 in FIG. 11, or aspects of the user equipment 104 depicted in FIG. 2, including receive processor 258, transmit processor 264, TX MIMO processor 266, and/or controller/processor 280 (including kernel function selection component 281).

Notably, FIG. 11 is just use example, and many other examples and configurations of communication device 1100 are possible.

Figure 12:
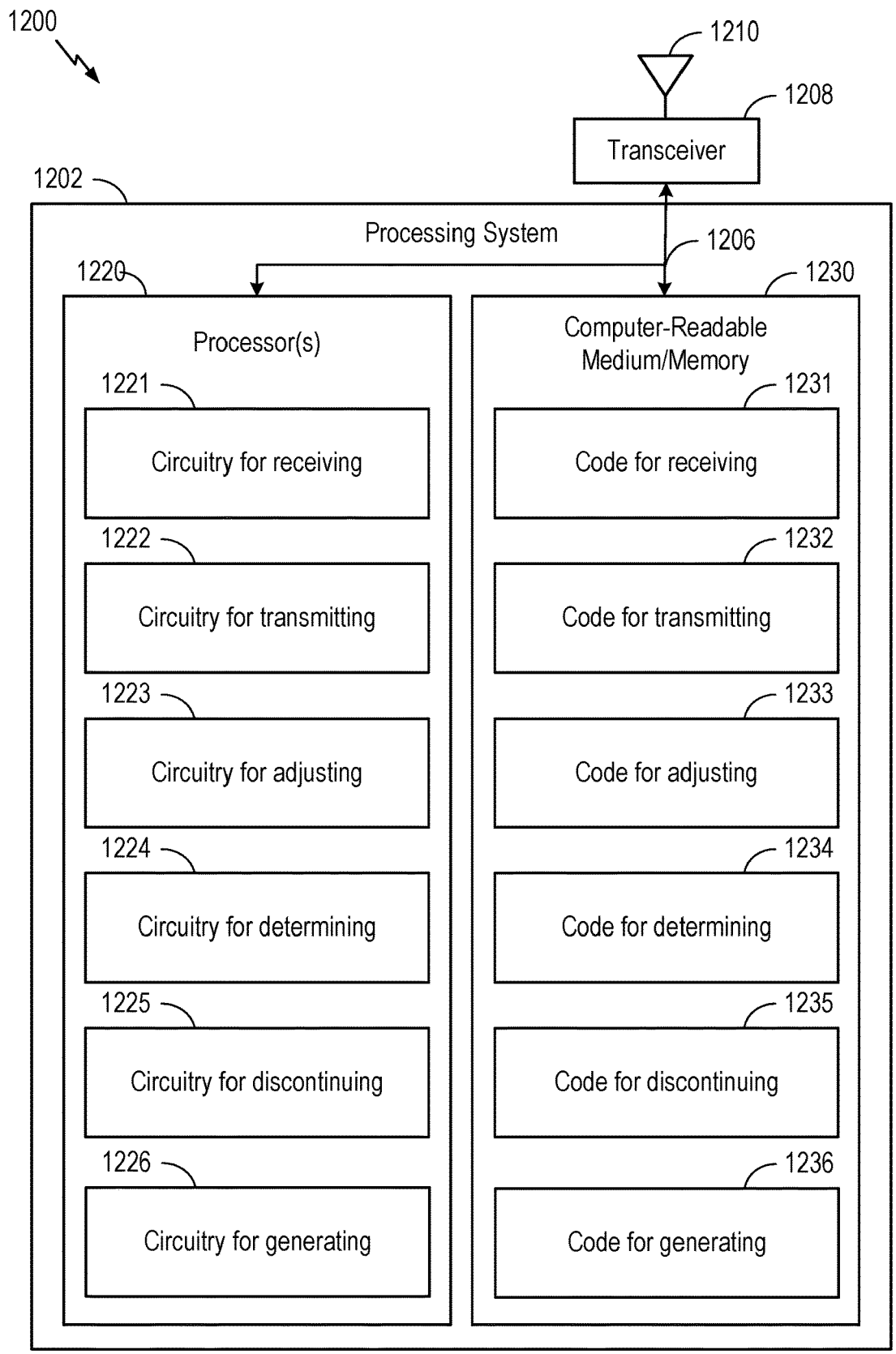

FIG. 12 depicts an example communications device 1200 that includes various components operable, configured, or adapted to perform operations for the techniques disclosed herein, such as the operations depicted and described with respect to FIGS. 6 and 10. In some examples, communication device 1200 may be a base station 102 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1220 via a bus 1206. In certain aspects, computer-readable medium/memory 1220 is configured to store instructions (e.g., computer-executable code) that when executed by the one or more processors 1220, cause the one or more processors 1220 to perform the operations illustrated in FIGS. 6 and 10, or other operations for performing the various techniques discussed herein for OTA DPD kernel function selection.

In the depicted example, computer-readable medium/memory 1230 stores code 1231 for receiving, code 1232 for transmitting, code 1233 for adjusting, code 1234 for determining, code 1235 for discontinuing, and code 1236 for generating.

In the depicted example, the one or more processors 1220 include circuitry configured to implement the code stored in the computer-readable medium/memory 1220, including circuitry 1221 for receiving, circuitry 1222 for transmitting, circuitry 1223 for adjusting, circuitry 1224 for determining, circuitry 1225 for discontinuing, and circuitry 1226 for generating.

Various components of communications device 1200 may provide means for performing the methods described herein, including with respect to FIGS. 6 and 10.

In some examples, means for transmitting or sending (or means for outputting for transmission) may include the transceivers 232 and/or antenna(s) 234 of the base station 102 illustrated in FIG. 2 and/or transceiver 1208 and antenna 1210 of the communication device 1200 in FIG. 12.

In some examples, means for receiving (or means for obtaining) may include the transceivers 232 and/or antenna(s) 234 of the base station illustrated in FIG. 2 and/or transceiver 1208 and antenna 1210 of the communication device 1200 in FIG. 12.

In some examples, means for adjusting, means for determining, means for discontinuing, and means for generating may include various processing system components, such as: the one or more processors 1220 in FIG. 12, or aspects of the base station 102 depicted in FIG. 2, including receive processor 238, transmit processor 220, TX MIMO processor 230, and/or controller/processor 240 (including kernel function selection component 241).

Notably, FIG. 12 is just use example, and many other examples and configurations of communication device 1200 are possible.

Example Clauses

Implementation examples are described in the following numbered clauses:

Clause 1: A method for wireless communication by a user equipment (UE), comprising: transmitting capability information to a base station (BS), indicating a capability of the UE for performing digital pre-distortion (DPD) training; receiving, based on the capability information, a request from the BS to perform the DPD training; performing, based on the received request, the DPD training, wherein performing the DPD training includes: receiving one or more reference signals (RSs); and selecting, based on the one or more RSs, an ordered set of kernel functions; and transmitting feedback information to the BS indicating the ordered set of kernel functions.

Clause 2: The method of Clause 1, wherein selecting the ordered set of kernel functions comprises selecting the ordered set of kernel functions from a plurality of kernel functions based on a selection algorithm and an evaluation function configured to generate an error metric associated with the ordered set of kernel functions.

Clause 3: The method of Clause 2, further comprising receiving, from the BS, an indication of the plurality of kernel functions from which to select the ordered set of kernel functions.

Clause 4: The method of any one of Clauses 2-3, further comprising performing the selection algorithm until a threshold number of kernel functions have been selected or a threshold error metric has been reached.

Clause 5: The method of Clause 4, further comprising receiving an indication of the threshold number of kernel functions to include in the ordered set of kernel functions.

Clause 6: The method of any one of Clauses 4-5, further comprising receiving an indication of the selection algorithm to use to select the ordered set of kernel functions, wherein performing the selection algorithm is based on the received indication.

Clause 7: The method of any one of Clauses 4-6, wherein performing the selection algorithm comprises: performing a greedy forward algorithm on the plurality of kernel functions to add kernel functions, from the plurality of kernel functions, to the ordered set of kernel functions, based on the evaluation function, until: the ordered set of kernel functions includes the threshold number of kernel functions; or the error metric associated with the ordered set of kernel functions reaches the threshold error metric.

Clause 8: The method of any one of Clauses 4-7, wherein performing the selection algorithm comprises: adding the plurality of kernel functions to the ordered set of kernel functions; and performing a greedy backward algorithm on the plurality of kernel functions to remove kernels from the ordered set of kernel functions, based on the evaluation function, until: the ordered set of kernel functions includes the threshold number of kernel functions; or the error metric associated with the ordered set of kernel functions reaches the threshold error metric.

Clause 9: The method of any one of Clauses 4-8, wherein performing the selection algorithm comprises: performing a greedy forward algorithm on the plurality of kernel functions to add kernel functions, from the plurality of kernel functions, to the ordered set of kernel functions, based on the evaluation function, until the error metric associated with the ordered set of kernel functions reaches the threshold error metric; and performing a greedy backward algorithm on the ordered set of kernel functions to remove kernels from the ordered set of kernel functions, based on the evaluation function, until the ordered set of kernel functions includes the threshold number of kernel functions.

Clause 10: The method of any one of Clauses 2-9, wherein the evaluation function involves a norm function and a linear transformation matrix.

Clause 11: The method of any one of Clauses 2-10, further comprising receiving, from the BS, an indication of the evaluation function.

Clause 12: The method of any one of Clauses 2-11, wherein the error metric comprises a mean squared error (MSE).

Clause 13: The method of any one of Clauses 1-12, further comprising receiving, from the BS, an indication of one or more kernel functions to include in the ordered set of kernel functions, wherein the feedback information transmitted to the BS indicating the ordered set of kernel functions does not include an indication of the one or more kernel functions indicated by the BS.

Clause 14: The method of any one of Clauses 1-13, wherein the ordered set of kernel functions comprise non-linear functions configured to reduce the distortion of signals transmitted by the BS caused by non-linearity of a power amplifier of the BS.

Clause 15: A method for wireless communication by a base station (BS), comprising: receiving capability information from a user equipment (UE), indicating a capability of the UE for performing digital pre-distortion (DPD) training; transmitting, based on the capability information, a request to the UE to perform the DPD training; transmitting, based on the request, one or more reference signals to the (RS) for performing the DPD training; receiving, based on the one or more RSs, feedback information from the UE indicating an ordered set of kernel functions; and adjusting one or more kernels associated with a power amplifier of the BS based on the ordered set of kernel functions to reduce the distortion of the signals transmitted by the BS.

Clause 16: The method of Clause 15, further comprising transmitting, to the UE, an indication of a plurality of kernel functions from which to select the ordered set of kernel functions.

Clause 17: The method of any one of Clauses 15-16, further comprising transmitting an indication of a threshold number of kernel functions to include in the ordered set of kernel functions.

Clause 18: The method of Clause 17, further comprising transmitting, to the UE, an indication of a selection algorithm to use to select the ordered set of kernel functions based on an evaluation function configured to generate an error metric associated with the ordered set of kernel functions.

Clause 19: The method of Clause 18, wherein the indication of the selection algorithm indicates to perform a greedy forward algorithm on the plurality of kernel functions to add kernel functions, from the plurality of kernel functions, to the ordered set of kernel functions, based on the evaluation function, until: the ordered set of kernel functions includes the threshold number of kernel functions; or the error metric associated with the ordered set of kernel functions reaches the threshold error metric.

Clause 20: The method of any one of Clauses 18-19, wherein the indication of the selection algorithm indicates to: add the plurality of kernel functions to the ordered set of kernel functions; and perform a greedy backward algorithm on the plurality of kernel functions to remove kernels from the ordered set of kernel functions, based on the evaluation function, until: the ordered set of kernel functions includes the threshold number of kernel functions; or the error metric associated with the ordered set of kernel functions reaches the threshold error metric.

Clause 21: The method of any one of Clauses 18-20, wherein the indication of the selection algorithm indicates to: perform a greedy forward algorithm on the plurality of kernel functions to add kernel functions, from the plurality of kernel functions, to the ordered set of kernel functions, based on the evaluation function, until the error metric associated with the ordered set of kernel functions reaches the threshold error metric; and perform a greedy backward algorithm on the ordered set of kernel functions to remove kernels from the ordered set of kernel functions, based on the evaluation function, until the ordered set of kernel functions includes the threshold number of kernel functions.

Clause 22: The method of any one of Clauses 18-21, further comprising transmitting, to the UE, an indication of the evaluation metric.

Clause 23: The method of any one of Clauses 18-22, wherein the evaluation function involves a norm function and a linear transformation matrix.

Clause 24: The method of any one of Clauses 15-23, further comprising transmitting, to the UE, an indication of one or more kernel functions to include in the ordered set of kernel functions, wherein the feedback information received from the UE indicating the ordered set of kernel functions does not include an indication of the one or more kernel functions indicated by the BS.

Clause 25: The method of any one of Clauses 15-24, wherein the kernel functions comprise non-linear functions.

Clause 26: The method of any one of Clauses 15-25, further comprising transmitting another request to the UE to perform the DPD training to further refine the adjusted kernel functions of the power amplifier of the BS.

Clause 27: The method of any one of Clauses 15-26, further comprising: transmitting an indication to the UE to perform distortion measurements on one or more transmissions from the BS; transmitting the one or more transmissions to the UE based on the indication to perform the distortion measurements; receiving an indication of the distortion measurements from the UE; determining, based on the distortion measurements, that the DPD training was successful; and discontinuing the DPD training with the UE based on the determination that the DPD training was successful.

Clause 28: The method of any one of Clauses 15-27, further comprising: receiving additional feedback information from at least one additional UE indicating another ordered set of kernel functions; and generating a unique ordered set of kernel functions based on the ordered set of kernel functions and the other ordered set of kernel functions, wherein adjusting one or more kernels associated with the power amplifier of the BS is based on the unique ordered set of kernel functions.

Clause 29: The method of any one of Clauses 15-28, wherein the DPD training for receiving the indication of the ordered set of kernel functions is performed at a first periodicity, which is longer than a second periodicity at which DPD training is performed for calculating coefficients for kernel functions in the ordered set of kernel functions.

Clause 30: An apparatus, comprising: a memory comprising executable instructions; one or more processors configured to execute the executable instructions and cause the apparatus to perform a method in accordance with any one of Clauses 1-29.

Clause 31: An apparatus, comprising means for performing a method in accordance with any one of Clauses 1-29.

Clause 32: A non-transitory computer-readable medium comprising executable instructions that, when executed by one or more processors of an apparatus, cause the apparatus to perform a method in accordance with any one of Clauses 1-29.

Clause 33: A computer program product embodied on a computer-readable storage medium comprising code for performing a method in accordance with any one of Clauses 1-29.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). ABS for a macro cell may be referred to as a macro BS. ABS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transmit/receive (TX/RX) front-end circuits 232a-232t. Each modulator in TX/RX front-end circuits 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in TX/RX front-end circuits 232a-232t may be transmitted via the antennas 234a-234t, respectively.

At UE 104, antennas 252a-252r may receive the downlink signals from the BS 102 and may provide received signals to the demodulators (DEMODs) in TX/RX front-end circuits 254a-254r, respectively. Each demodulator in TX/RX front-end circuits 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in TX/RX front-end circuits 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MOD) in TX/RX front-end circuits 254a-254r (e.g., for SC-FDM), and transmitted to BS 102.

At BS 102, the uplink signals from UE 104 may be received by antennas 234a-t, processed by the demodulators (DEMOD) in TX/RX front-end circuits 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of over-the-air (OTA) digital pre-distortion (DPD) in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
    transmitting capability information to a base station (BS), indicating a capability of the UE for performing digital pre-distortion (DPD) training;
    receiving, based on the capability information, a request from the BS to perform the DPD training;
    performing, based on the received request, the DPD training, wherein performing the DPD training includes:
        receiving one or more reference signals (RSs); and
        selecting, based on the one or more RSs, an ordered set of kernel functions; and
    transmitting feedback information to the BS indicating the ordered set of kernel functions.

2. The method of claim 1, wherein selecting the ordered set of kernel functions comprises selecting the ordered set of kernel functions from a plurality of kernel functions based on a selection algorithm and an evaluation function configured to generate an error metric associated with the ordered set of kernel functions.

3. The method of claim 2, further comprising receiving, from the BS, an indication of the plurality of kernel functions from which to select the ordered set of kernel functions.

4. The method of claim 2, further comprising performing the selection algorithm until a threshold number of kernel functions have been selected or a threshold error metric has been reached.

5. The method of claim 4, further comprising receiving an indication of the threshold number of kernel functions to include in the ordered set of kernel functions.

6. The method of claim 4, further comprising receiving an indication of the selection algorithm to use to select the ordered set of kernel functions, wherein performing the selection algorithm is based on the received indication.

7. The method of claim 4, wherein performing the selection algorithm comprises:
    performing a greedy forward algorithm on the plurality of kernel functions to add kernel functions, from the plurality of kernel functions, to the ordered set of kernel functions, based on the evaluation function, until:
        the ordered set of kernel functions includes the threshold number of kernel functions; or
        the error metric associated with the ordered set of kernel functions reaches the threshold error metric.

8. The method of claim 4, wherein performing the selection algorithm comprises:
    adding the plurality of kernel functions to the ordered set of kernel functions; and performing a greedy backward algorithm on the plurality of kernel functions to remove kernels from the ordered set of kernel functions, based on the evaluation function, until:
- the ordered set of kernel functions includes the threshold number of kernel functions; or
- the error metric associated with the ordered set of kernel functions reaches the threshold error metric.

9. The method of claim 4, wherein performing the selection algorithm comprises:
performing a greedy forward algorithm on the plurality of kernel functions to add kernel functions, from the plurality of kernel functions, to the ordered set of kernel functions, based on the evaluation function, until the error metric associated with the ordered set of kernel functions reaches the threshold error metric; and
performing a greedy backward algorithm on the ordered set of kernel functions to remove kernels from the ordered set of kernel functions, based on the evaluation function, until the ordered set of kernel functions includes the threshold number of kernel functions.

10. The method of claim 2, wherein the evaluation function involves a norm function and a linear transformation matrix.

11. The method of claim 2, further comprising receiving, from the BS, an indication of the evaluation function.

12. The method of claim 2, wherein the error metric comprises a mean squared error (MSE).

13. The method of claim 1, further comprising receiving, from the BS, an indication of one or more kernel functions to include in the ordered set of kernel functions, wherein the feedback information transmitted to the BS indicating the ordered set of kernel functions does not include an indication of the one or more kernel functions indicated by the BS.

14. The method of claim 1, wherein the ordered set of kernel functions comprise non-linear functions configured to reduce distortion of signals transmitted by the BS caused by non-linearity of a power amplifier of the BS.

15. A method for wireless communication by a base station (BS), comprising:
receiving capability information from a user equipment (UE), indicating a capability of the UE for performing digital pre-distortion (DPD) training;
transmitting, based on the capability information, a request to the UE to perform the DPD training;
transmitting, based on the request, one or more reference signals (RSs) to the UE for performing the DPD training;
receiving, based on the one or more RSs, feedback information from the UE indicating an ordered set of kernel functions; and
adjusting one or more kernels associated with a power amplifier of the BS based on the ordered set of kernel functions to reduce distortion of signals transmitted by the BS.

16. The method of claim 15, further comprising transmitting, to the UE, an indication of a plurality of kernel functions from which to select the ordered set of kernel functions.

17. The method of claim 16, further comprising transmitting an indication of a threshold number of kernel functions to include in the ordered set of kernel functions.

18. The method of claim 17, further comprising transmitting, to the UE, an indication of a selection algorithm to use to select the ordered set of kernel functions based on an evaluation function configured to generate an error metric associated with the ordered set of kernel functions.

19. The method of claim 18, wherein the indication of the selection algorithm indicates to perform a greedy forward algorithm on the plurality of kernel functions to add kernel functions, from the plurality of kernel functions, to the ordered set of kernel functions, based on the evaluation function, until:
- the ordered set of kernel functions includes the threshold number of kernel functions; or
- the error metric associated with the ordered set of kernel functions reaches a threshold error metric.

20. The method of claim 18, wherein the indication of the selection algorithm indicates to:
add the plurality of kernel functions to the ordered set of kernel functions; and
perform a greedy backward algorithm on the plurality of kernel functions to remove kernels from the ordered set of kernel functions, based on the evaluation function, until:
- the ordered set of kernel functions includes the threshold number of kernel functions; or
- the error metric associated with the ordered set of kernel functions reaches a threshold error metric.

21. The method of claim 18, wherein the indication of the selection algorithm indicates to:
perform a greedy forward algorithm on the plurality of kernel functions to add kernel functions, from the plurality of kernel functions, to the ordered set of kernel functions, based on the evaluation function, until the error metric associated with the ordered set of kernel functions reaches a threshold error metric; and
perform a greedy backward algorithm on the ordered set of kernel functions to remove kernels from the ordered set of kernel functions, based on the evaluation function, until the ordered set of kernel functions includes the threshold number of kernel functions.

22. The method of claim 18, further comprising transmitting, to the UE, an indication of the evaluation metric.

23. The method of claim 18, wherein the evaluation function involves a norm function and a linear transformation matrix.

24. The method of claim 15, further comprising transmitting, to the UE, an indication of one or more kernel functions to include in the ordered set of kernel functions, wherein the feedback information received from the UE indicating the ordered set of kernel functions does not include an indication of the one or more kernel functions indicated by the BS.

25. The method of claim 15, wherein kernel functions comprise non-linear functions.

26. The method of claim 15, further comprising transmitting another request to the UE to perform the DPD training to further refine the adjusted one or more kernels associated with the power amplifier of the BS.

27. The method of claim 15, further comprising:
transmitting an indication to the UE to perform distortion measurements on one or more transmissions from the BS;
transmitting the one or more transmissions to the UE based on the indication to perform the distortion measurements;
receiving an indication of the distortion measurements from the UE;
determining, based on the distortion measurements, that the DPD training was successful; and
discontinuing the DPD training with the UE based on the determination that the DPD training was successful.

28. The method of claim 15, further comprising:
receiving additional feedback information from at least one additional UE indicating another ordered set of kernel functions; and
generating a unique ordered set of kernel functions based on the ordered set of kernel functions and the other ordered set of kernel functions, wherein adjusting one or more kernels associated with the power amplifier of the BS is based on the unique ordered set of kernel functions.

29. A processing system for wireless communication by a user equipment (UE), comprising:
a memory comprising computer-executable instructions; and
one or more processors configured to execute the computer-executable instructions and cause the UE to:
transmit capability information to a base station (BS), indicating a capability of the UE for performing digital pre-distortion (DPD) training;
receive, based on the capability information, a request from the BS to perform the DPD training;
perform, based on the received request, the DPD training, wherein, in order to perform the DPD training, the processor is configured to cause the processing system to:
receive one or more reference signals (RSs); and
select, based on the one or more RSs, an ordered set of kernel functions; and
transmit feedback information to the BS indicating the ordered set of kernel functions.

30. A processing system for wireless communication by a base station (BS), comprising:
a memory comprising computer-executable instructions; and
one or more processors configured to execute the computer-executable instructions and cause the BS to:
receive capability information from a user equipment (UE), indicating a capability of the UE for performing digital pre-distortion (DPD) training;
transmit, based on the capability information, a request to the UE to perform the DPD training;
transmit, based on the request, one or more reference signals (RSs) to the UE for performing the DPD training;
receive, based on the one or more RSs, feedback information from the UE indicating an ordered set of kernel functions; and
adjust one or more kernels associated with a power amplifier of the BS based on the ordered set of kernel functions to reduce distortion of signals transmitted by the BS.

31. The BS of claim 30, wherein the one or more processors are further configured to cause the BS to transmit, to the UE, an indication of a plurality of kernel functions from which to select the ordered set of kernel functions.

32. The BS of claim 31, wherein the one or more processors are further configured to cause the BS to transmit an indication of a threshold number of kernel functions to include in the ordered set of kernel functions.

33. The BS of claim 32, wherein the one or more processors are further configured to cause the BS to transmit, to the UE, an indication of a selection algorithm to use to select the ordered set of kernel functions based on an evaluation function configured to generate an error metric associated with the ordered set of kernel functions.

34. The BS of claim 33, wherein the indication of the selection algorithm indicates to perform a greedy forward algorithm on the plurality of kernel functions to add kernel functions, from the plurality of kernel functions, to the ordered set of kernel functions, based on the evaluation function, until:
the ordered set of kernel functions includes the threshold number of kernel functions; or
the error metric associated with the ordered set of kernel functions reaches a threshold error metric.

35. The BS of claim 33, wherein the indication of the selection algorithm indicates to:
add the plurality of kernel functions to the ordered set of kernel functions; and
perform a greedy backward algorithm on the plurality of kernel functions to remove kernels from the ordered set of kernel functions, based on the evaluation function, until:
the ordered set of kernel functions includes the threshold number of kernel functions; or
the error metric associated with the ordered set of kernel functions reaches a threshold error metric.

36. The BS of claim 33, wherein the indication of the selection algorithm indicates to:
perform a greedy forward algorithm on the plurality of kernel functions to add kernel functions, from the plurality of kernel functions, to the ordered set of kernel functions, based on the evaluation function, until the error metric associated with the ordered set of kernel functions reaches a threshold error metric; and
perform a greedy backward algorithm on the ordered set of kernel functions to remove kernels from the ordered set of kernel functions, based on the evaluation function, until the ordered set of kernel functions includes the threshold number of kernel functions.

37. The BS of claim 33, wherein the one or more processors are further configured to cause the BS to transmit, to the UE, an indication of the evaluation function.

38. The BS of claim 33, wherein the evaluation function involves a norm function and a linear transformation matrix.

39. The BS of claim 30, wherein the one or more processors are further configured to cause the BS to transmit, to the UE, an indication of one or more kernel functions to include in the ordered set of kernel functions, wherein the feedback information received from the UE indicating the ordered set of kernel functions does not include an indication of the one or more kernel functions indicated by the BS.

40. The BS of claim 30, wherein kernel functions in the ordered set of kernel functions comprise non-linear functions.

41. The BS of claim 30, wherein the one or more processors are further configured to cause the BS to transmit another request to the UE to perform the DPD training to further refine the adjusted one or more kernels associated with the power amplifier of the BS.

42. The BS of claim 30, wherein the one or more processors are further configured to cause the BS to:
transmit an indication to the UE to perform distortion measurements on one or more transmissions from the BS;
transmit the one or more transmissions to the UE based on the indication to perform the distortion measurements;
receive an indication of the distortion measurements from the UE;
determine, based on the distortion measurements, that the DPD training was successful; and
discontinue the DPD training with the UE based on the determination that the DPD training was successful.

43. The BS of claim 30, wherein the one or more processors are further configured to cause the BS to:
receive additional feedback information from at least one additional UE indicating another ordered set of kernel functions; and
generate a unique ordered set of kernel functions based on the ordered set of kernel functions and the other ordered set of kernel functions, wherein adjusting one or more kernels associated with the power amplifier of the BS is based on the unique ordered set of kernel functions.

44. The UE of claim 29, wherein, in order to select the ordered set of kernel functions, the one or more processors are configured to cause the UE to select the ordered set of kernel functions from a plurality of kernel functions based on a selection algorithm and an evaluation function configured to generate an error metric associated with the ordered set of kernel functions.

45. The UE of claim 44, wherein the one or more processors are further configured to cause the UE to receive, from the BS, an indication of the plurality of kernel functions from which to select the ordered set of kernel functions.

46. The UE of claim 44, wherein the one or more processors are further configured to cause the UE to perform the selection algorithm until a threshold number of kernel functions have been selected or a threshold error metric has been reached.

47. The UE of claim 46, wherein the one or more processors are further configured to cause the UE to receive an indication of the threshold number of kernel functions to include in the ordered set of kernel functions.

48. The UE of claim 46, wherein the one or more processors are further configured to cause the UE to receive an indication of the selection algorithm to use to select the ordered set of kernel functions, wherein performing the selection algorithm is based on the received indication.

49. The UE of claim 46, wherein, in order to perform the selection algorithm, the one or more processors are further configured to:
perform a greedy forward algorithm on the plurality of kernel functions to add kernel functions, from the plurality of kernel functions, to the ordered set of kernel functions, based on the evaluation function, until:
the ordered set of kernel functions includes the threshold number of kernel functions; or
the error metric associated with the ordered set of kernel functions reaches the threshold error metric.

50. The UE of claim 46, wherein, in order to perform the selection algorithm, the one or more processors are further configured to:
add the plurality of kernel functions to the ordered set of kernel functions; and
perform a greedy backward algorithm on the plurality of kernel functions to remove kernels from the ordered set of kernel functions, based on the evaluation function, until:
the ordered set of kernel functions includes the threshold number of kernel functions; or
the error metric associated with the ordered set of kernel functions reaches the threshold error metric.

51. The UE of claim 46, wherein, in order to perform the selection algorithm, the one or more processors are further configured to:
perform a greedy forward algorithm on the plurality of kernel functions to add kernel functions, from the plurality of kernel functions, to the ordered set of kernel functions, based on the evaluation function, until the error metric associated with the ordered set of kernel functions reaches the threshold error metric; and
perform a greedy backward algorithm on the ordered set of kernel functions to remove kernels from the ordered set of kernel functions, based on the evaluation function, until the ordered set of kernel functions includes the threshold number of kernel functions.

52. The UE of claim 44, wherein the evaluation function involves a norm function and a linear transformation matrix.

53. The UE of claim 44, wherein the one or more processors are further configured to cause the UE to receive, from the BS, an indication of the evaluation function.

54. The UE of claim 44, wherein the error metric comprises a mean squared error (MSE).

55. The UE of claim 29, wherein the one or more processors are further configured to cause the UE to receive, from the BS, an indication of one or more kernel functions to include in the ordered set of kernel functions, wherein the feedback information transmitted to the BS indicating the ordered set of kernel functions does not include an indication of the one or more kernel functions indicated by the BS.

56. The UE of claim 29, wherein the ordered set of kernel functions comprise non-linear functions configured to reduce distortion of signals transmitted by the BS caused by non-linearity of a power amplifier of the BS.

* * * * *